United States Patent
Hamamoto et al.

(10) Patent No.: US 11,578,643 B2
(45) Date of Patent: Feb. 14, 2023

(54) VEHICULAR HEAT ACCUMULATING SYSTEM

(71) Applicant: JAPAN CLIMATE SYSTEMS CORPORATION, Hiroshima (JP)

(72) Inventors: Hiroshi Hamamoto, Hiroshima (JP); Yoichi Miyazaki, Hiroshima (JP)

(73) Assignee: JAPAN CLIMATE SYSTEMS CORPORATION, Hiroshima (JP)

( * ) Notice: Subject to any disclaimer, the term of this patent is extended or adjusted under 35 U.S.C. 154(b) by 0 days.

(21) Appl. No.: 17/568,018

(22) Filed: Jan. 4, 2022

(65) Prior Publication Data
US 2022/0136430 A1   May 5, 2022

Related U.S. Application Data

(63) Continuation of application No. PCT/JP2020/026870, filed on Jul. 9, 2020.

(30) Foreign Application Priority Data

Jul. 16, 2019   (JP) .............................. JP2019-130822

(51) Int. Cl.
*F01P 7/16*        (2006.01)
*B60H 1/00*        (2006.01)
*F01P 11/14*       (2006.01)
*B60H 1/03*        (2006.01)
*F01P 3/20*        (2006.01)
*F01P 11/20*       (2006.01)

(52) U.S. Cl.
CPC .......... *F01P 11/14* (2013.01); *B60H 1/00492* (2013.01); *B60H 1/03* (2013.01); *F01P 3/20* (2013.01); *F01P 2011/205* (2013.01)

(58) Field of Classification Search
CPC ... F01P 7/16; F01P 2011/205; B60H 1/00492; F28D 20/021
See application file for complete search history.

(56) References Cited

U.S. PATENT DOCUMENTS

| | | | | |
|---|---|---|---|---|
| 5,507,153 A | * | 4/1996 | Seto ................... | B60H 1/00492 62/133 |
| 2010/0251711 A1 | * | 10/2010 | Howes ..................... | F01K 3/12 60/659 |
| 2010/0293966 A1 | * | 11/2010 | Yokomachi ........ | B60H 1/00478 62/271 |

(Continued)

FOREIGN PATENT DOCUMENTS

JP   2004-239591 A   8/2004

*Primary Examiner* — Long T Tran
(74) *Attorney, Agent, or Firm* — Renner, Otto, Boisselle & Sklar, LLP

(57) ABSTRACT

A heat accumulating unit includes an upstream heat accumulator and a downstream heat accumulator each accommodating a supercooling heat accumulating material. Each of the upstream heat accumulator and the downstream heat accumulator has a channel in which fluid flows. In heat accumulation of the supercooling heat accumulating material, the channel of the upstream heat accumulator and the channel of the downstream heat accumulator are set in a serial connection state by a serial connection pipe. In a temperature rise mode, fluid that has passed through the channel of the upstream heat accumulator flows in a bypass pipe.

9 Claims, 9 Drawing Sheets

(56) References Cited

U.S. PATENT DOCUMENTS

| | | | |
|---|---|---|---|
| 2014/0060794 A1* | 3/2014 | Ishii | B60H 1/00885 |
| | | | 165/287 |
| 2015/0218969 A1* | 8/2015 | Reznik | F22B 33/185 |
| | | | 60/659 |
| 2016/0075208 A1* | 3/2016 | Goenka | B60H 1/005 |
| | | | 62/99 |
| 2017/0211861 A1* | 7/2017 | Liu | F25B 40/06 |
| 2018/0023453 A1* | 1/2018 | Okamura | F01P 7/165 |
| | | | 123/142.5 E |
| 2018/0340712 A1* | 11/2018 | Peter | F28D 20/02 |
| 2019/0375270 A1* | 12/2019 | Boger | B60H 1/00392 |
| 2020/0224574 A1* | 7/2020 | Toyokawa | F02D 41/064 |

* cited by examiner

VEHICULAR HEAT ACCUMULATING SYSTEM

CROSS-REFERENCE TO RELATED APPLICATION

This is a continuation of PCT International Application PCT/JP2020/026870 filed on Jul. 9, 2020, which claims priority to Japanese Patent Application No. 2019-130822 filed on Jul. 16, 2019. The disclosures of these applications including the specifications, the drawings, and the claims are hereby incorporated by reference in their entirety.

TECHNICAL FIELD

The present invention relates to a vehicular heat accumulating system mounted on a vehicle including a heat source.

BACKGROUND

An automobile generally includes a cooling water circuit for cooling an engine. The cooling water circuit includes, for example, a radiator for cooling engine cooling water flowing in a water jacket of the engine and a heater core for heating air-conditioning air by engine cooling water.

In recent years, there has been an increasing demand for quickly warming an engine after cold start in order to enhance fuel efficiency and promote exhaust gas purification. Japanese Patent Application Publication No. 2004-239591 describes that a supercooling heat accumulation device as well as the radiator and the heater core is connected to the cooling water circuit. The supercooling heat accumulation device includes a supercooling heat accumulating material, and a heat accumulator tank storing the supercooling heat accumulating material. The supercooling heat accumulating material has a property that does not solidify and has latent heat of solidification while being in a liquid-phase state to enter a supercooling state even at a temperature of a melting point or less and that quickly solidifies and rapidly emits a large quantity of latent heat of solidification when the supercooling state is canceled by a specific external stimulus. While the supercooling heat accumulating material quickly emits heat, the temperature of the supercooling heat accumulating material is maintained at a melting point of the supercooling heat accumulating material.

In Japanese Patent Application Publication No. 2004-239591, during operation of the engine, engine cooling water is caused to flow into a tube in the heat accumulator tank in a heat accumulating mode so that heat of engine cooling water is accumulated in the supercooling heat accumulating material, and in a quick engine warming mode, the supercooling state of the supercooling heat accumulating material is canceled by an ultrasonic trigger device so that the supercooling heat accumulating material emits latent heat of solidification. This latent heat of solidification is transferred to engine cooling water flowing by way of the supercooling heat accumulation device to thereby quickly increase the temperature of engine cooling water.

SUMMARY

A typical supercooling heat accumulating material is liquid in supercooling and is solidified by emitting latent heat of solidification. In heat accumulation, the supercooling heat accumulating device melts from the solid state and becomes liquid, but does not generate heat unless the entire amount of the supercooling heat accumulating material melts. Accordingly, in the case of Japanese Patent Application Publication No. 2004-239591, the supercooling heat accumulating material starts accumulating heat after the temperature of engine cooling water has reached a melting point or more of the supercooling heat accumulating material.

To enhance an engine warm-up effect in the quick engine warming mode, the amount of the supercooling heat accumulating material, that is, the total amount of accumulated heat, needs to be at a certain level or more. Thus, in the heat accumulating mode, a sufficient heat accumulation time is needed to change the entire amount of the supercooling heat accumulating material to a liquid state for heat accumulation. In consideration of use conditions of an automobile, however, the automobile stops after short-period traveling before the entire amount of the supercooling heat accumulating material becomes liquid, and accordingly, the engine as a heat source stops in some cases, and the frequency of this stop is not low. In this case, the supercooling heat accumulating material does not dissipate heat even by heat generation operation, and no quick engine warm-up effect can be obtained.

To obtain the quick engine warm-up effect, reduction of the amount of the supercooling heat accumulating material may be effective. However, this reduction would not achieve an engine warm-up effect in the quick engine warming mode as described above. Thus, reduction of the amount of the supercooling heat accumulating material is preferably avoided.

In view of this, it may be effective to use a plurality of heat accumulator tanks whose size is reduced to reduce the capacity of the supercooling heat accumulating material in each heat accumulator tank so that a predetermined total amount of the supercooling heat accumulating material is obtained. In the case of providing a plurality of heat accumulator tanks, if engine cooling water is caused to flow into the tanks in parallel in the heat accumulating mode, the problem described above occurs. Thus, engine cooling water needs to be caused to flow into the tanks in series. Accordingly, with reduction of the amount of the supercooling heat accumulating material stored in each heat accumulator tank, the supercooling heat accumulating material in a heat accumulator tank located upstream in a flow direction of engine cooling water completely melts so that heat generation operation of the heat accumulator tank can be performed.

However, in the case of performing heat generation operation in order to expect quick engine warm-up at next engine start after an automobile is stopped after short-period driving, the upstream supercooling heat accumulating material dissipates heat so that the temperature of engine cooling water can be temporarily increased. However, while this engine cooling water flows in a downstream heat accumulator tank, heat of the engine cooling water is taken by the supercooling heat accumulating material stored in the downstream heat accumulator tank. This heat dissipation loss reduces the temperature of engine cooling water before the engine cooling water flows into the engine. Consequently, the quick engine warm-up effect significantly decreases.

Other examples of the device requiring a quick engine warm-up effect include an automatic transmission, as well as the engine. The automatic transmission, for example, also has similar problems.

It is therefore an object of the present invention to obtain a heat dissipation effect of a supercooling heat accumulating material even after a short heat accumulation time with an enhanced warm-up effect by the supercooling heat accumulating material obtained by reducing a heat dissipation loss.

To achieve the object, according to the present invention, an upstream heat accumulator and a downstream heat accumulator each storing a supercooling heat accumulating material are provided, and the upstream heat accumulator and the downstream heat accumulator operate as a series circuit in heat accumulation, whereas fluid flows while bypassing the downstream heat accumulator in heat dissipation.

In a first aspect, in a vehicular heat accumulating system including a circulation circuit in which fluid circulates, the circulation circuit includes a heat accumulating unit that accumulates heat from the fluid or dissipates heat to the fluid, the heat accumulating unit includes an upstream heat accumulator, the upstream heat accumulator accommodating a supercooling heat accumulating material, having a channel in which the fluid flows, configured to enable heat exchange between the fluid flowing in the channel and the supercooling heat accumulating material, disposed at an upstream side in a flow direction of the fluid, a downstream heat accumulator, the downstream heat accumulator accommodating a supercooling heat accumulating material, having a channel in which the fluid flows, configured to enable heat exchange between the fluid flowing in the channel and the supercooling heat accumulating material, disposed at a downstream side in the flow direction of the fluid, a serial connection pipe connecting the channel of the upstream heat accumulator and the channel of the downstream heat accumulator to each other in series, a bypass pipe configured to cause the fluid that has flowed in the channel of the upstream heat accumulator to bypass the channel of the downstream heat accumulator, a pipe switching section configured to perform switching between the serial connection pipe and the bypass pipe, a supercooling cancel device configured to cancel a supercooling state of the supercooling heat accumulating material, and a control device configured to control the pipe switching section and the supercooling cancel device, the control device causes the supercooling cancel device to cancel the supercooling state of the supercooling heat accumulating material so that a temperature rise mode in which a temperature of a warming target is increased, if the supercooling heat accumulating material is in the supercooling state and a temperature rise of the warming target is requested, and the control device controls the pipe switching section such that the channel of the upstream heat accumulator and the channel of the downstream heat accumulator are set in a serial connection state by the serial connection pipe in heat accumulation of the supercooling heat accumulating material, and the fluid that has passed through the upstream heat accumulator flows in the bypass pipe in the temperature rise mode.

With this configuration, while fluid circulates in the circulation circuit, the heat accumulating unit takes heat from the fluid to thereby accumulate heat. In heat accumulation, the pipe switching section causes the channel of the upstream heat accumulator and the channel of the downstream heat accumulator are connected in series by the serial connection pipe, and thus, after fluid has flowed in the channel of the upstream heat accumulator, the fluid flows in the channel of the downstream heat accumulator. Accordingly, the supercooling heat accumulating material of the upstream heat accumulator tends to melt more quickly to be in a supercooling state than the supercooling heat accumulating material of the downstream heat accumulator. Thus, even in a case where the heat source is an engine and stops in a short time after cold start, for example, the supercooling heat accumulating material of the upstream heat accumulator can be set in the supercooling state.

If a temperature rise of a warming target is requested, the supercooling cancel device cancels the supercooling state of the supercooling heat accumulating material of the upstream heat accumulator, and the heat accumulating unit is switched from the heat accumulating mode to the temperature rise mode. In the temperature rise mode, the pipe switching section causes fluid that has flowed in the upstream heat accumulator to flow in the bypass pipe. At this time, since the supercooling heat accumulating material of the upstream heat accumulator dissipates latent heat of solidification, fluid flowing in the channel of the upstream heat accumulator takes heat and increases in temperature. Accordingly, the warm-up effect is enhanced. On the other hand, if the heat accumulation time is short, the supercooling heat accumulating material of the downstream heat accumulator does not reach the supercooling state in some cases. In such cases, the supercooling heat accumulating material of the downstream heat accumulator does not dissipate heat, but since fluid does not flow in the channel of the downstream heat accumulator, latent heat is not taken from the fluid, and a heat dissipation loss can be reduced accordingly.

In a second aspect, the heat accumulating unit may include a heat dissipation completion detecting section that detects completion of heat dissipation of the supercooling heat accumulating material of the upstream heat accumulator, and the control device may control the pipe switching section such that the fluid that has flowed in the channel of the upstream heat accumulator flows in the bypass pipe until the heat dissipation completion detecting section detects completion of heat dissipation of the supercooling heat accumulating material of the upstream heat accumulator, whereas when the heat dissipation completion detecting section detects completion of heat dissipation of the supercooling heat accumulating material of the upstream heat accumulator, the fluid that has flowed in the channel of the upstream heat accumulator flows in the channel of the downstream heat accumulator.

With this configuration, since fluid takes heat until heat dissipation of the supercooling heat accumulating material of the upstream heat accumulator is completed, it is possible to prevent fluid from flowing in the channel of the downstream heat accumulator where a heat dissipation loss might occur. On the other hand, when heat dissipation of the supercooling heat accumulating material of the upstream heat accumulator is completed, fluid flows in the channel of the downstream heat accumulator. At this time, if the heat accumulating material of the downstream heat accumulator is in the state of enabling heat dissipation, the fluid takes heat from this supercooling heat accumulating material so that the temperature of the fluid increases. The heat dissipation completion detecting section can individually perform detection of heat dissipation completion of the supercooling heat accumulating material of the upstream heat accumulator and detection of heat dissipation completion of the supercooling heat accumulating material of the downstream heat accumulator.

In a third aspect, the pipe switching section may be disposed between the upstream heat accumulator and the downstream heat accumulator.

Specifically, the presence of the pipe switching section increases an outer surface area, and accordingly, a heat dissipation loss occurs from this area. In heat dissipation of the supercooling heat accumulating material, the temperature of fluid before flowing into the downstream heat accumulator through the upstream heat accumulator is supposed to be lower than the temperature of fluid at an outlet side of the downstream heat accumulator. The pipe switching section is provided not at the outlet side of the downstream heat accumulator where fluid having a relatively high temperature flows but in a portion between the upstream heat accumulator and the downstream heat accumulator where fluid having a relatively low temperature flows so that a loss in heat dissipation due to an increase in the outer surface area can be thereby reduced.

In a fourth aspect, the pipe switching section may be disposed downstream of the channel of the downstream heat accumulator.

Specifically, the presence of the pipe switching section increases an outer surface aera, and accordingly, a heat dissipation loss occurs from this area. In heat accumulation of the supercooling heat accumulating material, the temperature of fluid that has flowed out of the downstream heat accumulator through the upstream heat accumulator is considered to be lower than the temperature of fluid at the inlet side of the upstream heat accumulator or the temperature of fluid flowing between the upstream heat accumulator and the downstream heat accumulator. Since the pipe switching section is provided in a portion where fluid having a relatively low temperature flows, a loss in heat accumulation due to an increase in the outer surface area can be reduced. The pipe switching section may be constituted by, for example, a motor-operated valve.

In a fifth aspect, the heat dissipation completion detecting section may be configured to determine that dissipation of the supercooling heat accumulating material of the upstream heat accumulator is completed when a temperature difference of the fluid between an inlet side and an outlet side of the channel of the upstream heat accumulator becomes smaller than a predetermined value.

That is, while the supercooling heat accumulating material of the upstream heat accumulator dissipates heat, a fluid temperature difference between the inlet side and the outlet side of the channel of the upstream heat accumulator is large. This temperature difference decreases as the amount of heat dissipation of the supercooling heat accumulating material decreases, and when heat dissipation of the supercooling heat accumulating material is completed, the temperature difference decreases below a predetermined value. Thus, it is reliably detected whether heat dissipation of the supercooling heat accumulating material of the upstream heat accumulator is completed or not.

In a sixth aspect, the supercooling cancel device may be disposed in each of the upstream heat accumulator and the downstream heat accumulator, and configured to cancel the supercooling state of the supercooling heat accumulating material of the upstream heat accumulator and the supercooling state of the supercooling heat accumulating material of the downstream heat accumulator individually.

With this configuration, the supercooling state of each of the supercooling heat accumulating material of the upstream heat accumulator and the supercooling heat accumulating material of the downstream heat accumulator can be canceled at an appropriate timing.

In a seventh aspect, the control device may cause the supercooling cancel device to cancel the supercooling state of the supercooling heat accumulating material of the upstream heat accumulator when a heat source changes from a state where no heat is generated to a state where heat is generated, and cause the supercooling cancel device to cancel the supercooling state of the supercooling heat accumulating material of the downstream heat accumulator when the heat dissipation completion detecting section detects completion of heat dissipation of the supercooling heat accumulating material of the upstream heat accumulator.

With this configuration, heat dissipation of the supercooling heat accumulating material of the downstream heat accumulator starts after dissipation of the supercooling heat accumulating material of the upstream heat accumulator has been completed, and thus, the quantity of heat accumulated in the supercooling heat accumulating material of the upstream heat accumulator and the quantity of heat accumulated in the supercooling heat accumulating material of the downstream heat accumulator are supplied to fluid.

In an eighth aspect, the heat accumulating unit may include a first heat accumulator and a second heat accumulator, and a wall portion of a part of the first heat accumulator may be shared by a wall portion of the second heat accumulator.

With this configuration, the wall portion of a part of the first heat accumulator and the wall portion of the second heat accumulator are shared. Thus, the area of heat dissipation to the outside decreases in the temperature rise mode, and efficiency in warming fluid by the supercooling heat accumulating material increases. In addition, the number of parts can be reduced, and the size of the heat accumulating unit can be reduced.

In a ninth aspect, the heat accumulating unit may include a first heat accumulator and a second heat accumulator, and a gap may be provided between the first heat accumulator and the second heat accumulator.

With this configuration, heat transfer between the first heat accumulator and the second heat accumulator is reduced. Thus, the time before completion of heat accumulation of the supercooling heat accumulating material of the first heat accumulator can be shortened.

In the first aspect, the upstream heat accumulator and the downstream heat accumulator each accommodating the supercooling heat accumulating material are provided, and the upstream heat accumulator and the downstream heat accumulator operate as a series circuit in heat accumulation, whereas fluid is caused to flow while bypassing the downstream heat accumulator in heat dissipation. Thus, in the case of accumulating heat by using the supercooling heat accumulating material, even if the heat accumulation time is short, a heat dissipation effect can be obtained after the short heat accumulation time. In addition, a heat dissipation loss is reduced so that the effect of warming the warming target with the supercooling heat accumulating material can be thereby enhanced.

In the second aspect, fluid that has flowed in the channel of the upstream heat accumulator is caused to flow in the bypass pipe until heat dissipation of the supercooling heat accumulating material of the upstream heat accumulator is completed, whereas when heat dissipation of the supercooling heat accumulating material of the upstream heat accumulator is completed, fluid that has passed in the channel of the upstream heat accumulator is caused to flow in the channel of the downstream heat accumulator. Thus, the effect of warming the warming target can be further enhanced.

In the third aspect, since the pipe switching section is disposed between the upstream heat accumulator and the downstream heat accumulator, a loss in heat dissipation due to the presence of the pipe switching section can be reduced.

In the fourth aspect, since the pipe switching section is disposed downstream of the channel of the downstream heat accumulator, a loss in heat accumulation due to the presence of the pipe switching section can be reduced.

In a fifth aspect, it is reliably detected whether heat dissipation of the supercooling heat accumulating material of the upstream heat accumulator is completed or not based on the fluid temperature difference between the inlet side and the outlet side of the channel of the upstream heat accumulator.

In the sixth aspect, the supercooling state of each of the supercooling heat accumulating material of the heat accumulator and the supercooling heat accumulating material of the downstream heat accumulator can be canceled at an appropriate timing.

In the seventh aspect, it is possible to ensure supply of the quantity of heat accumulated in the supercooling heat accumulating material of the upstream heat accumulator and the quantity of heat accumulated in the supercooling heat accumulating material of the downstream heat accumulator to the fluid.

In the eighth aspect, by sharing the wall portion of a part of the first heat accumulator and the wall portion of the second heat accumulator, efficiency of warming fluid in the temperature rise mode can be enhanced so that the fluid temperature can be increased early. In addition, the number of parts constituting the heat accumulating unit can be reduced, and the size of the heat accumulating unit can be reduced.

In the ninth aspect, since the gap is provided between the first heat accumulator and the second heat accumulator, heat transfer between the first heat accumulator and the second heat accumulator is reduced so that the time before completion of heat accumulation of the supercooling heat accumulating material of the first heat accumulator can be shortened, and heat dissipation effect can be sufficiently obtained after the short heat accumulation time.

DETAILED DESCRIPTION

Embodiments of the present invention will be described in detail with reference to the drawings. The following embodiments are merely preferred examples in nature, and are not intended to limit the invention, applications, and use of the applications.

Figure 1:
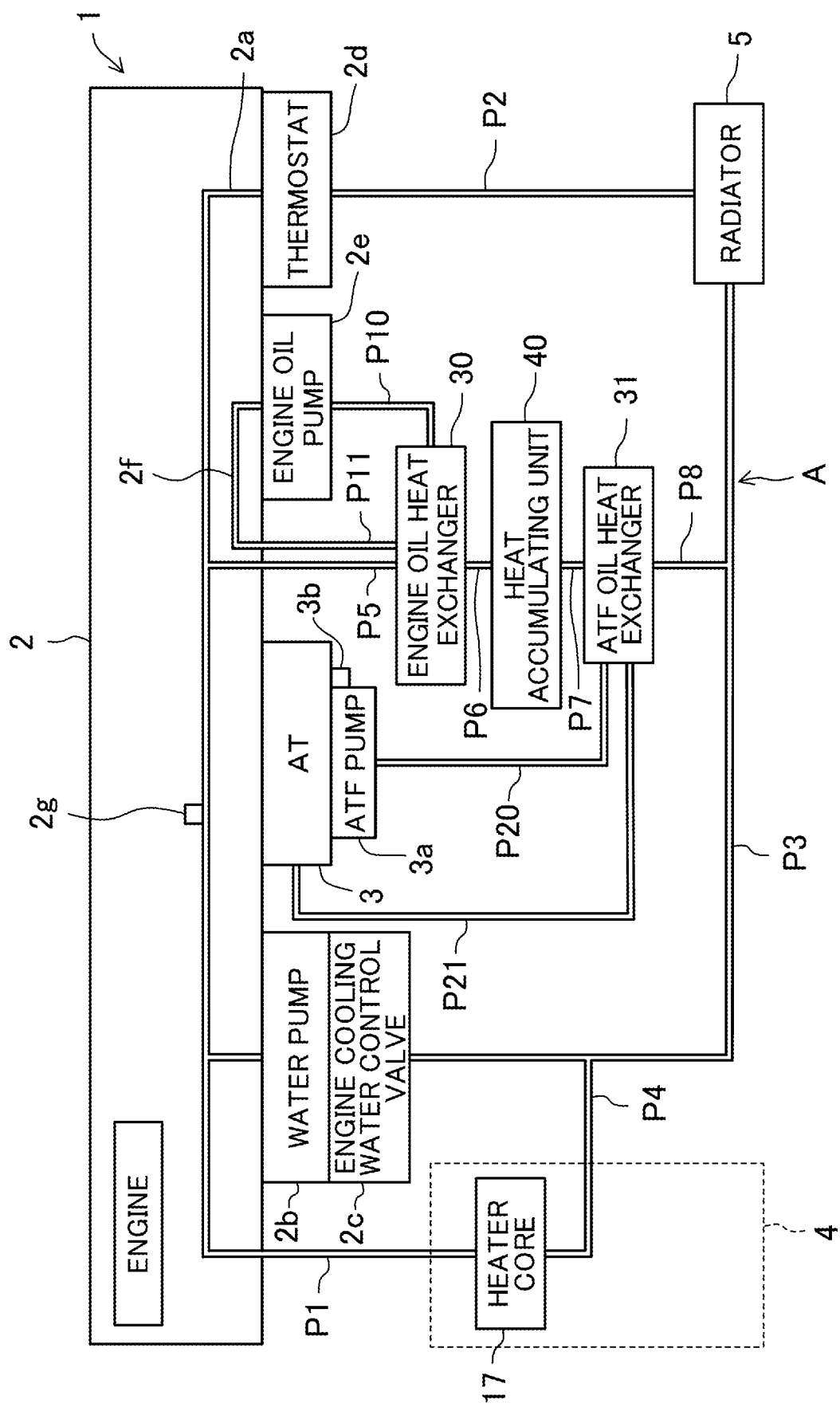
FIG. 1 is a schematic configuration diagram of a vehicular heat accumulating system according to a first embodiment of the present invention.

FIG. 1 is a schematic view illustrating an overall configuration of a vehicular heat accumulating system 1 according to an embodiment of the present invention. A vehicle on which the vehicular heat accumulating system 1 is mounted is an automobile including an engine 2, and also includes an automatic transmission 3, a vehicular air-conditioning device 4, a radiator 5, and so forth, as well as the engine 2.

(Configuration of Engine 2)

The engine 2 is mounted in an engine room (not shown) disposed in a front portion of the automobile, and generates a driving force for driving wheels of the automobile. Although not shown, an electric generator may be driven by the engine 2 so that electric power generated by the electric generator is supplied to a motor and the wheels are driven by an output of the motor. The automobile may be a so-called hybrid vehicle configured to travel by both an output of the engine 2 and an output of the motor. The automobile may be a plug-in type hybrid vehicle. The engine 2 generates heat during driving, and thus, corresponds to a heat source of the vehicle. The motor and an inverter device for controlling the motor, for example, also generate heat, and thus, can be heat sources. A plurality of heat sources may be provided.

Figure 3:
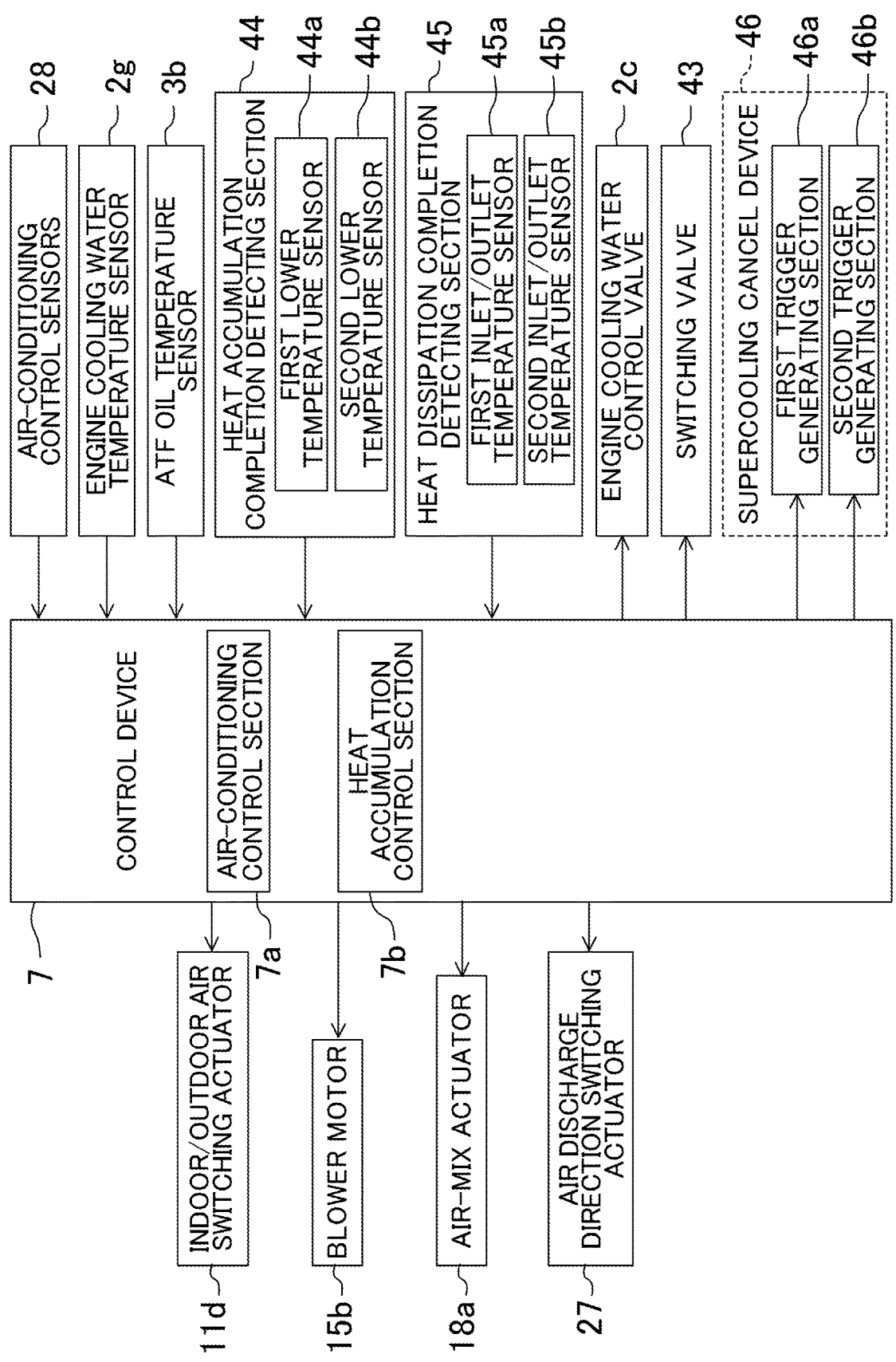
FIG. 3 is a block diagram of the vehicular heat accumulating system.

The engine 2 includes a water jacket 2a in which engine cooling water (coolant) as cooling fluid flows. The engine 2 includes, for example, a water pump 2b, an engine cooling water control valve 2c, and a thermostat 2d. The water pump 2b is used for feeding engine cooling water to flow in the water jacket 2a. The water pump 2b may be driven by a rotary force of a crankshaft or may be driven by an unillustrated electric motor. The cooling water control valve 2c is used for changing a flow rate of engine cooling water circulated by the water pump 2b. As illustrated in FIG. 3, the engine cooling water control valve 2c is connected to a control device 7 described later, and is controlled by the control device 7 in accordance with, for example, a temperature of engine cooling water.

The thermostat 2d is a valve that is closed when engine cooling water flowing in the water jacket 2a is less than a predetermined temperature so that engine cooling water does not flow to the radiator 5, and is open when engine cooling water is at the predetermined temperature or more so that engine cooling water flows to the radiator 5. The predetermined temperature in this case is a temperature at which engine cooling water needs to be cooled by the radiator 5, and may be set at about 80° C. to 90° C., for example.

The engine 2 includes an engine oil pump 2e for feeding engine oil to flow in an oil passage 2f disposed in the engine 2. The engine 2 includes an engine oil supply pipe P10 and an engine oil discharge pipe P11. An upstream end of the engine oil supply pipe P10 is connected to an outlet of the engine oil pump 2e. A downstream end of the engine oil supply pipe P10 is connected to an oil inlet of an engine oil heat exchanger 30 described later. An upstream end of the engine oil discharge pipe P11 is connected to an oil outlet of the engine oil heat exchanger 30. A downstream end of the engine oil discharge pipe P11 is connected to the oil passage 2f of the engine 2. Accordingly, engine oil that has flowed out of the oil passage 2f flows from the engine oil supply pipe P10 in an oil channel formed in the engine oil heat exchanger 30 and returns to the oil passage 2f from the engine oil discharge pipe P11.

The engine 2 is provided with an engine cooling water temperature sensor 2g for detecting a temperature of engine cooling water. The engine cooling water temperature sensor 2g is configured to detect a temperature of engine cooling water flowing in the water jacket 2a, for example. As illustrated in FIG. 3, the engine cooling water temperature sensor 2g is connected to the control device 7, and outputs the detected engine cooling water temperature to the control device 7.

(Configuration of Automatic Transmission 3)

The automatic transmission 3 is a so-called automatic gear-shift device, and receives a driving force output from the crankshaft of the engine 2. The driving force received by the automatic transmission 3 is decelerated with deceleration gears or accelerated with acceleration gears, and is output from the automatic transmission 3. The automatic transmission 3 accommodates oil called automatic transmission fluid (ATF). The automatic transmission 3 includes an ATF pump 3a for feeding ATF. Although not shown, the automatic transmission 3 may be replaced by a continuously variable transmission (CVT).

The automatic transmission 3 includes an ATF feed pump P20 and an ATF discharge pipe P21. An upstream end of the ATF feed pump P20 is connected to an outlet of the ATF pump 3a. A downstream end of the ATF feed pump P20 is connected to an oil inlet of an ATF heat exchanger 31 described later. An upstream end of the ATF discharge pipe P21 is connected to an oil outlet of the ATF heat exchanger 31. A downstream end of the ATF discharge pipe P21 is connected to the body of the automatic transmission 3. Accordingly, ATF that has flowed out of the automatic transmission 3 flows through an ATF channel in the ATF heat exchanger 31 from the ATF feed pump P20, and returns to the automatic transmission 3 from the ATF discharge pipe P21.

The automatic transmission 3 is provided with an ATF temperature sensor 3b for detecting a temperature of ATF. The ATF temperature sensor 3b is configured to detect a temperature of ATF in the automatic transmission 3, for example. As illustrated in FIG. 3, the ATF temperature sensor 3b is connected to the control device 7, and outputs the detected ATF temperature to the control device 7.

(Overall Configuration of Vehicular Heat Accumulating System 1)

The vehicular heat accumulating system 1 includes a circulation circuit A in which engine cooling water circulates, and the control device 7 illustrated in FIG. 3. The circulation circuit A includes the water jacket 2a, the water pump 2b, the cooling water control valve 2c, and the thermostat 2d of the engine 2, the radiator 5, a heater core 17, the engine oil heat exchanger 30, the ATF oil heat exchanger 31, and a heat accumulating unit 40.

The circulation circuit A also includes a heater core supply pipe P1 extending from the water jacket 2a to the heater core 17, a radiator supply pipe P2 extending from an outlet side of the thermostat 2d to the radiator 5, a radiator discharge pipe P3 extending from an outlet side of the radiator 5 to an inlet side of the engine cooling water control valve 2c, a heater core discharge pipe P4 extending from an outlet side of the heater core 17 to an intermediate portion of the radiator discharge pipe P3, an engine oil heat exchanger supply pipe P5 extending from the water jacket 2a to a cooling water inlet side of the engine oil heat exchanger 30, a heat accumulating unit supply pipe P6 extending from a cooling water outlet side of the engine oil heat exchanger 30 to a cooling water inlet side of the heat accumulating unit 40, an ATF oil heat exchanger supply pipe P7 extending from a cooling water outlet side of the heat accumulating unit 40 to a cooling water inlet side of the ATF oil heat exchanger 31, and a heat exchanger discharge pipe P8 extending from a cooling water outlet side of the ATF oil heat exchanger 31 to an intermediate portion of the radiator discharge pipe P3. The heater core discharge pipe P4 and the radiator discharge pipe P3 are connected to each other. The heat exchanger discharge pipe P8 and the radiator discharge pipe P3 are connected to each other. The circulation circuit A may have a configuration other than the unillustrated configuration. For example, the engine oil heat exchanger 30 may be provided when necessary, and may be omitted.

When warming of the engine 2 is completed and the engine cooling water temperature increases, the thermostat 2d is opened. When the thermostat 2d is opened, engine cooling water flows in the radiator supply pipe P2 from the water jacket 2a, and enters the radiator 5 from an inlet of the radiator 5 to enable heat exchange with external air. Engine cooling water that has flowed out of an outlet of the radiator 5 is fed by the water pump 2b such that the engine cooling water flows in the radiator discharge pipe P3 to enter an inlet of the engine cooling water control valve 2c and returns to the water jacket 2a through the engine cooling water control valve 2c and the water pump 2b.

The water pump 2b causes engine cooling water in the water jacket 2a to be supplied from the heater core supply pipe P1 to an inlet of the heater core 17 and enter the heater core 17. The engine cooling water that has entered the heater core 17 can exchange heat with air-conditioning air. Engine cooling water that has flowed out of an outlet of the heater core 17 flows in the heater core discharge pipe P4 to enter the radiator discharge pipe P3, and returns to the water jacket 2a through the engine cooling water control valve 2c and the water pump 2b.

The water pump 2b also causes engine cooling water in the water jacket 2a to be supplied from the engine oil heat exchanger supply pipe P5 to a cooling water inlet of the engine oil heat exchanger 30 and enter the engine oil heat exchanger 30. In the engine oil heat exchanger 30, since the oil passage is formed in the engine oil heat exchanger 30 and engine oil flows in this oil passage as described above, heat exchange can be performed between this oil passage and engine cooling water flowing in the engine oil heat exchanger 30. In an example configuration enabling heat exchange, a tube, for example, in which engine cooling water flows is provided in the engine oil heat exchanger 30 and an oil passage is formed such that engine oil flows along the outer surface of the tube, for example. For example, if the temperature of engine cooling water is higher than the temperature of engine oil, the engine oil takes heat from the engine cooling water so that the temperature of the engine oil rises.

Engine cooling water that has flowed out of a cooling water outlet of the engine oil heat exchanger 30 flows into a channel of engine cooling water in the heat accumulating unit 40 from the heat accumulating unit supply pipe P6. The heat accumulating unit 40 will be described later. Engine cooling water that has flowed out of the cooling water outlet side of the heat accumulating unit 40 is supplied from the ATF oil heat exchanger supply pipe P7 to the cooling water inlet of the ATF oil heat exchanger 31 and enters the ATF oil heat exchanger 31. In the ATF oil heat exchanger 31, the oil passage is formed therein and ATF flows in this oil passage as described above. Thus, heat exchange can be performed between the ATF and engine cooling water flowing in the ATF oil heat exchanger 31. In an example configuration enabling heat exchange, a tube in which engine cooling water flows, for example, is provided in the ATF oil heat exchanger 31 and an oil passage is formed such that ATF flows along the outer surface of the tube.

Here, if the temperature of engine cooling water is higher than the temperature of ATF, the ATF takes heat from the engine cooling water so that the temperature of the ATF rises. The ATF oil heat exchanger 31 is a heat exchanger that takes heat from engine cooling water and increases the temperature of ATF as a warming target. The automatic transmission 3 can also be a warming target. Engine cooling water that has flowed out of a cooling water outlet of the ATF oil heat exchanger 31 flows in the heat exchanger discharge pipe P8 to enter the radiator discharge pipe P3, and returns to the water jacket 2a.

(Configuration of Vehicular Air-Conditioning Device 4)

Figure 2:
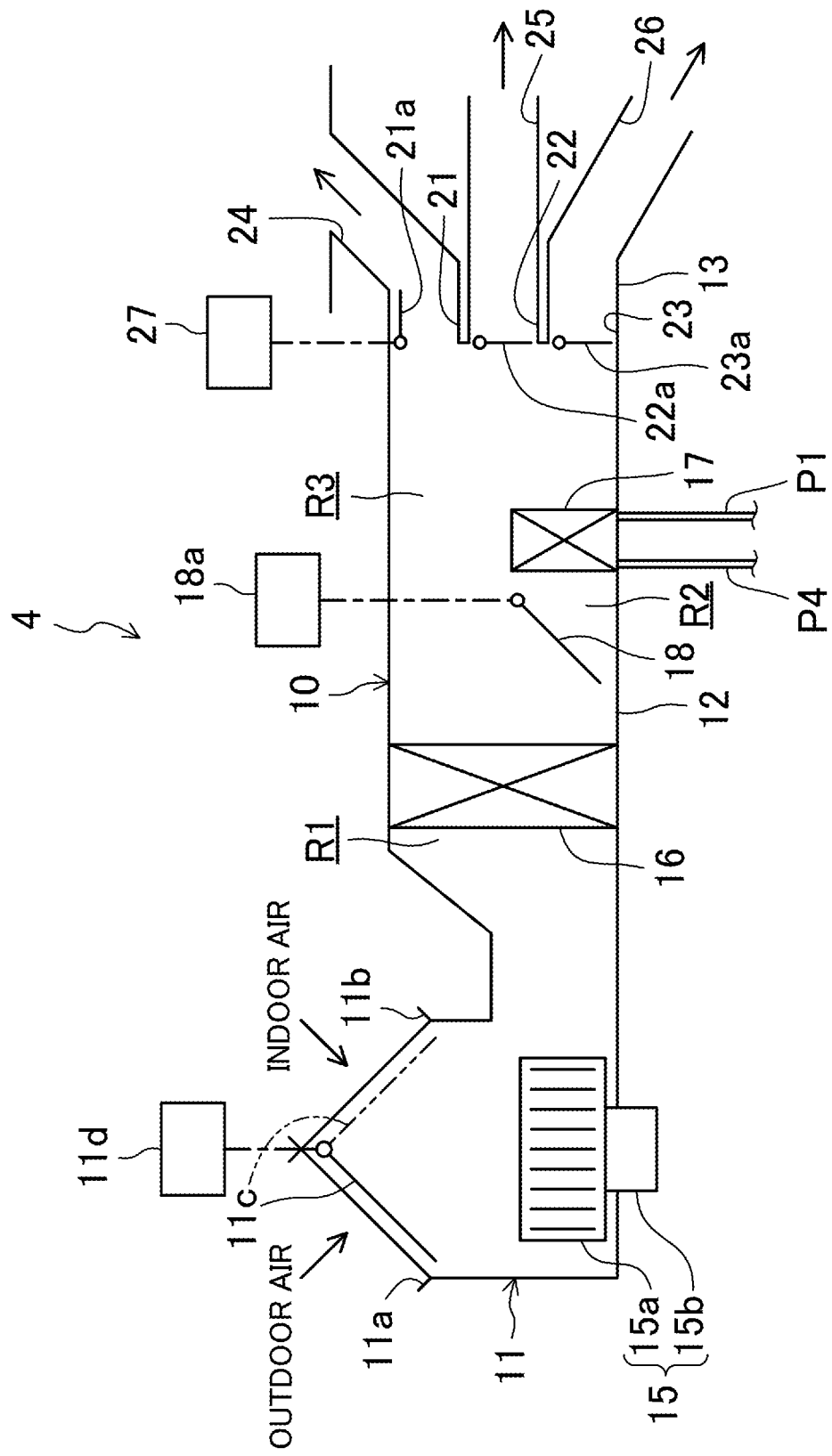
FIG. 2 is a schematic configuration diagram of a vehicular air-conditioning device mounted on a vehicle.

The vehicular air-conditioning device 4 illustrated in FIG. 2 is configured such that both air in a cabin (indoor air) and air outside the cabin (outdoor air) are introduced therein and subjected to temperature adjustment and then supplied to portions of the cabin. The vehicular air-conditioning device 4 includes an air-conditioning casing 10 and an air-conditioning control section 7a (shown in FIG. 3). The air-conditioning casing 10 is housed in an instrument panel (not shown) disposed in a front end portion of the cabin, for example. The air-conditioning casing 10 includes an air supply casing 11, a temperature adjustment section 12, and an air discharge direction switching section 13 that are arranged in this order from an upstream side to a downstream side in an airflow direction. The air supply casing 11 has an outdoor air inlet 11a and an indoor air inlet 11b. The outdoor air inlet 11a communicates with the outside of the cabin through an unillustrated intake duct, for example, and introduces air outside the cabin (outdoor air). The indoor air inlet 11b is open inside the instrument panel, introduces air in the cabin (indoor air), and allows the air to circulate in the cabin. The amount of outdoor air introduced from the outdoor air inlet 11a is an outdoor air introduction amount. The amount of indoor air introduced from the indoor air inlet 11b is an indoor air circulation amount.

In the air supply casing 11, an indoor/outdoor air switching damper 11c that opens and closes the outdoor air inlet 11a and the indoor air inlet 11b is disposed. The indoor/outdoor air switching damper 11c is constituted by, for example, a cantilever damper or a rotary damper each made of, for example, a plate-shaped member, and supported to be pivotable with respect to a side wall of the air supply casing 11. The indoor/outdoor air switching damper 11c may be constituted by, for example, an unillustrated film damper.

The indoor/outdoor air switching damper 11c is driven to be at an intended pivot angle by an indoor/outdoor air switching actuator (indoor/outdoor air switching damper driving section) 11d. Accordingly, an intake mode is switched. The indoor/outdoor air switching actuator 11d is controlled in a manner described above by the air-conditioning control section 7a of the control device 7.

For example, as illustrated by solid lines in FIG. 2, when the indoor/outdoor air switching damper 11c pivots such that the outdoor air inlet 11a is fully closed and the indoor air inlet 11b is fully opened, the intake mode changes to an indoor air circulation mode. It is assumed that the opening degree of the indoor/outdoor air switching damper 11c at this time is 100%. On the other hand, as illustrated by imaginary lines in FIG. 2, when the indoor/outdoor air switching damper 11c pivots such that the outdoor air inlet 11a is fully opened and the indoor air inlet 11b is fully closed, the intake mode changes to an outdoor air introduction mode. It is assumed that the opening degree of the indoor/outdoor air switching damper 11c at this time is 0%. While the opening degree of the indoor/outdoor air switching damper 11c is between 1% to 99%, both the outdoor air inlet 11a and the indoor air inlet 11b are open so that both indoor air and outdoor air are introduced to the temperature adjustment section 12. This intake mode is an indoor/outdoor air mixed mode. In the indoor/outdoor air mixed mode, an introduction ratio of indoor air and outdoor air is changed in accordance with the opening degree of the indoor/outdoor air switching damper 11c. Accordingly, the outdoor air introduction amount and the indoor air circulation amount change.

The air supply casing 11 is provided with an air blower 15. The air blower 15 includes a fan 15a and a blower motor 15b for driving the fan 15a. At least one of indoor air or outdoor air is introduced to the air supply casing 11 by rotation of the fan 15a, and then is sent to the temperature adjustment section 12 provided below the air supply casing 11. The blower motor 15b is configured to adjust the rotation speed per a unit time by changing a voltage to be applied to the blower motor 15b. The air blow rate changes in accordance with the rotation speed of the blower motor 15b. The blower motor 15b is controlled by the air-conditioning control section 7a of the control device 7.

The temperature adjustment section 12 is a section for adjusting the temperature of air-conditioning air introduced from the air supply casing 11. In the temperature adjustment section 12, a cooling heat exchanger 16, a heating heat exchanger 17, and an air-mix door 18 are disposed. Specifically, a cold air passage R1 is formed at an upstream side in the airflow direction in the temperature adjustment section 12, and the cold air passage R1 houses the cooling heat exchanger 16. A lower side of the cold air passage R1 is branched into a warm air passage R2 and a bypass passage R3, and the warm air passage R2 houses a heater core (heating heat exchanger) 17. The cooling heat exchanger 16 may be constituted by, for example, a refrigerant evaporator such as a heat pump device. However, the present invention is not limited to this example, and the cooling heat exchanger 16 only needs to cool air.

The air-mix door 18 is disposed between the cooling heat exchanger 16 and the heater core 17, and opens and closes an upstream end of the warm air passage R2 and an upstream end of the bypass passage R3. The air-mix door 18 can be constituted by, for example, a plate-shaped member, and is supported to be pivotable with respect to a side wall of the temperature adjustment section 12. The air-mix door 18 is driven to be at an intended pivot angle by an air-mix actuator 18a. The air-mix actuator 18a is controlled by the air-conditioning control section 7a of the control device 7.

When the air-mix door 18 fully opens the upstream end of the warm air passage R2 and fully closes the upstream end of the bypass passage R3, the entire amount of cold air generated in the cold air passage R1 flows in the warm air passage R2 to be heated, and thus, warm air flows into the air discharge direction switching section 13. On the other hand, when the air-mix door 18 fully closes the upstream end of the warm air passage R2 and fully opens the upstream end of the bypass passage R3, the entire amount of cold air generated in the cold air passage R1 flows into the bypass passage R3, and thus, cold air flows into the air discharge direction switching section 13. While the air-mix door 18 is in a pivot position in which the air-mix door 18 opens the upstream end of the warm air passage R2 and the upstream end of the bypass passage R3, a mixture of cold air and warm air flows into the air discharge direction switching section 13. The amount of cold air and the amount of warm air flowing into the air discharge direction switching section 13 are changed in accordance with the pivot position of the air-mix door 18 so that conditioned air having an intended temperature is generated. The air-mix door 18 is not limited to the plate-shaped door described above, and may have any structure as long as the amount of cold air and the amount of warm air can be changed. The air-mix door 18 may be, for example, a rotary door, a film door, or a louver damper. The structure for temperature adjustment does not need to be the structure described above, and only needs to be a structure capable of changing the amount of cold air and the amount of warm air.

The air discharge direction switching section 13 is a section for supplying conditioned air subjected to temperature adjustment in the temperature adjustment section 12, to portions of the cabin. The air discharge direction switching section 13 includes a defroster outlet opening 21, a vent outlet opening 22, and a heat outlet opening 23. The defroster outlet opening 21 is connected to a defroster nozzle 24 formed in the instrument panel. The defroster outlet opening 21 is used for supplying conditioned air to a cabin inner surface of a front window pane (not shown). In the defroster outlet opening 21, a defroster door 21a is provided for opening and closing the defroster outlet opening 21.

The vent outlet opening 22 is connected to a vent nozzle 25 formed in the instrument panel. The vent nozzle 25 is used for supplying conditioned air to the upper body of a passenger on a front seat, and provided at each of a center portion and the left and right sides of the instrument panel in the vehicle width direction. In the vent outlet opening 22, a vent door 22a for opening and closing the vent outlet opening 22 is provided.

The heat outlet opening 23 is connected to a heat duct 26 extending to the vicinity of the feet of a passenger. The heat duct 26 is used for supplying conditioned air to the feet of a passenger. In the heat outlet opening 23, a heat door 23a for opening and closing the heat outlet opening 23 is provided.

The defroster door 21a, the vent door 22a, and the heat door 23a are driven by an air discharge direction switching actuator 27, and are opened and closed. The air discharge direction switching actuator 2 is controlled by the air-conditioning control section 7a of the control device 7. The defroster door 21a, the vent door 22a, and the heat door 23a interact with one another through an unillustrated linkage, are switched to an intended air discharge mode among a plurality of air discharge modes such as a defroster mode in which the defroster door 21a is open and the vent door 22a and the heat door 23a are closed, a vent mode in which the defroster door 21a and the heat door 23a are closed and the vent door 22a is open, a heat mode in which the defroster door 21a and the vent door 22a are closed and the heat door 23a is opened, a def-vent mode in which the defroster door 21a and the vent door 22a are open and the heat door 23a is closed, and a bi-level mode in which the defroster door 21a and the heat door 23a are open and the vent door 22a is closed.

(Configuration of Heat Accumulating Unit 40)

As illustrated in FIG. 1, the heat accumulating unit 40 is disposed upstream of the ATF oil heat exchanger 31 in the flow direction of engine cooling water. The heat accumulating unit 40 is configured to take heat from engine cooling water and accumulate heat in a supercooling heat accumulating material when engine cooling water is at a predetermined temperature or more. The supercooling heat accumulating material does not solidify and remains in a liquid-phase state and has latent heat of solidification to enter a supercooling state even at a temperature less than or equal to a melting point, and rapidly releases a large amount of latent heat of solidification. During the rapid discharge of heat, the temperature of the supercooling heat accumulating material is kept at a melting point of the supercooling heat accumulating material. As such a supercooling heat accumulating material, a conventionally known material, such as materials disclosed in Japanese Patent Application Publication No. 2004-239591 (sodium acetate trihydrate, and erythritol (meso-erythritol)), may be used.

Figure 6:
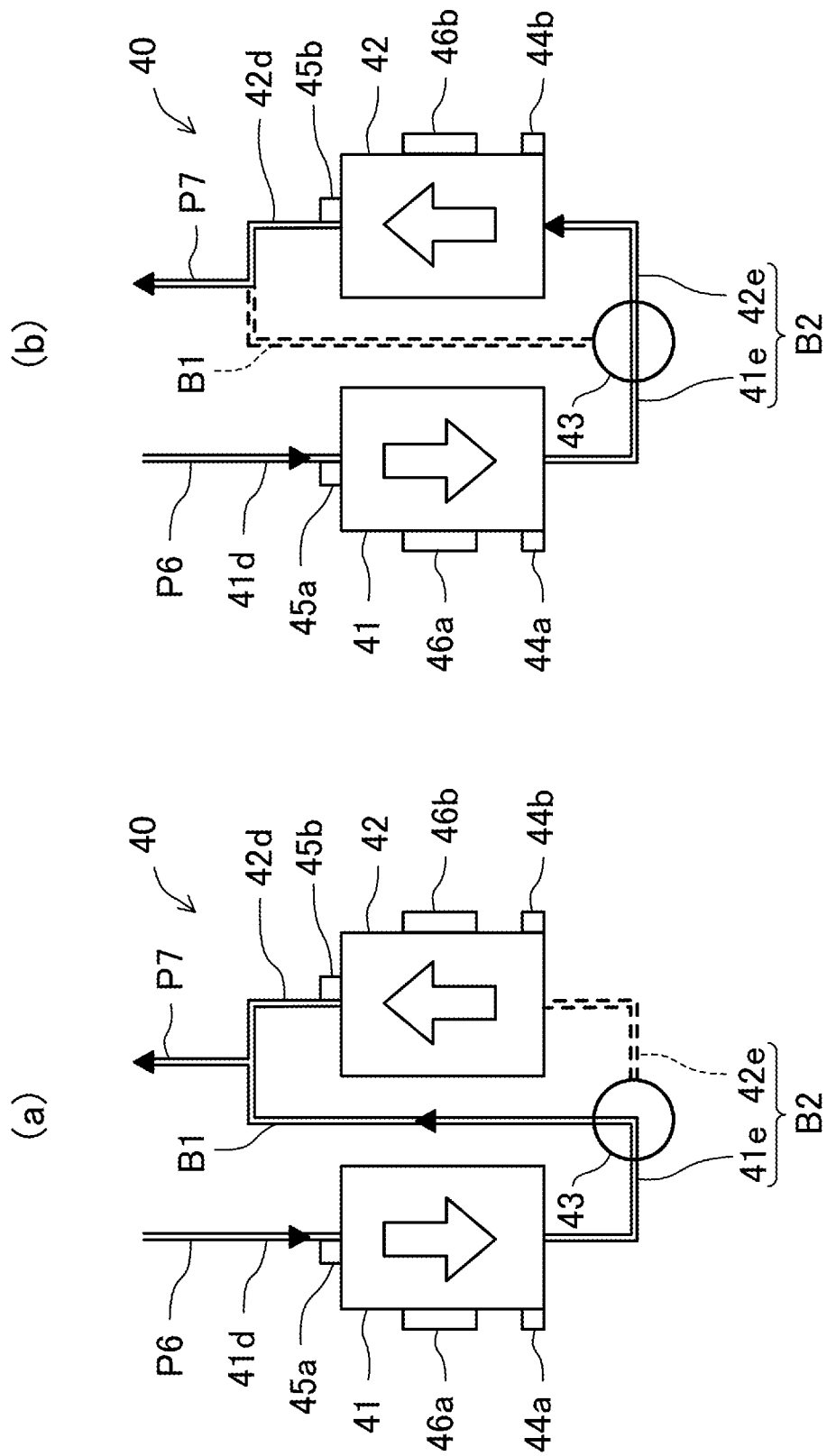
FIG. 6 is a view showing a flow of engine cooling water in the heat accumulating unit.

Specifically, as illustrated in FIG. 6, the heat accumulating unit 40 includes a first heat accumulator 41, a second heat accumulator 42, a switching valve 43, and a bypass pipe B1. The first heat accumulator 41 is disposed upstream of the second heat accumulator 42 in the flow direction of engine cooling water. Thus, the first heat accumulator 41 is an upstream heat accumulator of the present invention, and the second heat accumulator 42 is a downstream heat accumulator of the present invention. Although the bypass pipe B1 is disposed between the first heat accumulator 41 and the second heat accumulator 42 in FIG. 6, the bypass pipe B1 may be disposed in a position except for the position between the first heat accumulator 41 and the second heat accumulator 42. In this case, as illustrated in FIG. 4, the heat accumulating unit 40 is constituted without any gap present between the first heat accumulator 41 and the second heat accumulator 42.

Figure 4:
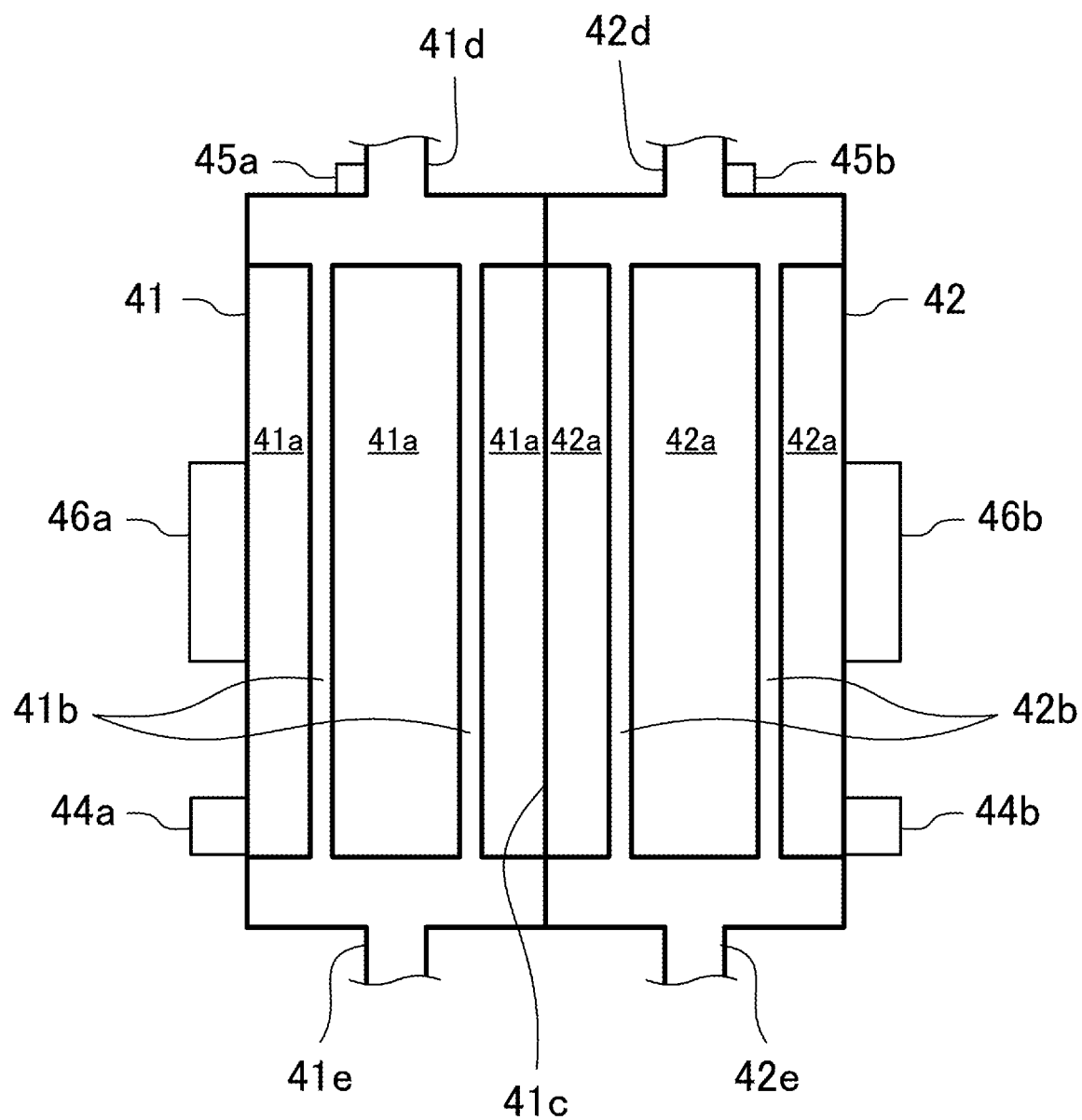
FIG. 4 is a cross-sectional view of a heat accumulating unit.

As illustrated in FIG. 4, the first heat accumulator 41 includes a first accommodation space 41a for accommodating a supercooling heat accumulating material, and a first channel 41b in which engine cooling water flows. The first channel 41b is located between the first accommodation spaces 41a and 41a, and engine cooling water flowing in the first channel 41b and the supercooling heat accumulating material can exchange heat. The first channel 41b is formed to extend upward and downward. The number of first accommodation spaces 41a and the number of first channels 41b may be one or more. The first heat accumulator 41 is mounted on the vehicle such that an upper portion in FIG. 4 is located above, but the present invention is not limited to this example. The configuration may be changed depending on layout. In the description of this embodiment, the upper side and the lower side are defined for convenience of description, but may be changed in accordance with the direction in which the heat accumulating unit 40 is mounted. With respect to the flow direction of engine cooling water, the upper side of the first heat accumulator 41 is an upstream side, the lower side of the first heat accumulator 41 is a downstream side, a lower side of the second heat accumulator 42 is an upstream side, and the upper side of the second heat accumulator 42 is a downstream side. A portion to contact the supercooling heat accumulating material is coated with a known resin in order to prevent corrosion by the supercooling heat accumulating material.

The second heat accumulator 42 is configured in a manner similar to the first heat accumulator 41, and includes a second accommodation space 42a for accommodating a supercooling heat accumulating material and a second channel 42b in which engine cooling water flows. The first heat accumulator 41 and the second heat accumulator 42 may be disposed side by side horizontally. In this embodiment, a part of a wall portion of the first heat accumulator 41 of the heat accumulating unit 40 may be shared by a wall portion of the second heat accumulator 42. That is, a wall portion 41c of the first heat accumulator 41 toward the second heat accumulator 42 is a wall portion defining the first accommodation space 41a. The wall portion 41c defines the second accommodation space 42a located in the second heat accumulator 42 toward the first heat accumulator 41. Thus, the first accommodation space 41a of the first heat accumulator 41 and the second accommodation space 42a of the second heat accumulator 42 are adjacent to each other with the wall portion 41c interposed therebetween. Since a part of the wall portion 41c of the first heat accumulator 41 and the wall portion of the second heat accumulator 42 are shared, the area of heat dissipation to the outside decreases, and efficiency in warming engine cooling water by the supercooling heat accumulating material increases. In addition, the number of parts can be reduced, and the size of the heat accumulating unit 40 can be reduced.

The first heat accumulator 41 is provided with a first upper pipe 41*d* connected to an upper side of the first channel 41*b* and a first lower pipe 41*e* connected to a lower side of the first channel 41*b*. In the flow direction of engine cooling water, the first upper pipe 41*d* is an upstream pipe, and the first lower pipe 41*e* is a downstream pipe. As illustrated in FIG. 6, an upper side of the first upper pipe 41*d* is connected to a downstream side of the heat accumulating unit supply pipe P6. The second heat accumulator 42 is provided with a second upper pipe 42*d* connected to an upper side of the second channel 42*b* and a second lower pipe 42*e* connected to a lower side of the second channel 42*b*. In the flow direction of engine cooling water, the second upper pipe 42*d* is a downstream pipe, and the second lower pipe 42*e* is an upstream pipe As illustrated in FIG. 3, the heat accumulating unit 40 includes a heat accumulation completion detecting section 44 connected to the control device 7. As illustrated in FIG. 4, the heat accumulation completion detecting section 44 includes a first lower temperature sensor 44*a* disposed in a lower portion of the first heat accumulator 41, and a second lower temperature sensor 44*b* disposed in a lower portion of the second heat accumulator 42. The first lower temperature sensor 44*a* is a sensor for detecting a temperature of a supercooling heat accumulating material accommodated in a lower portion of the first accommodation space 41*a*. The second lower temperature sensor 44*b* is a sensor for detecting a temperature of a supercooling heat accumulating material accommodated in a lower portion of the second accommodation space 42*a*. The heat accumulation completion detecting section 44 is configured to determine that heat accumulation of the supercooling heat accumulating material in the first heat accumulator 41 is completed when the temperature detected by the first lower temperature sensor 44*a* reaches a predetermined value or more. That is, while the supercooling heat accumulating material of the first heat accumulator 41 accumulates heat, although the phase of the supercooling heat accumulating material changes add from solid to liquid, heat is transferred from the supercooling heat accumulating material in the liquid state to an upper portion of the first heat accumulator 41 by natural convection. Thus, a lower portion of the first heat accumulator 41 has a lowest temperature. That is, when the portion of the first heat accumulator 41 having the lowest temperature reaches a temperature of a melting point or more, for example, it is determined that the entire supercooling heat accumulating material of the first heat accumulator 41 is liquefied and heat accumulation is completed. With this detection, detection accuracy at completion of heat accumulation is enhanced. The heat accumulation completion detecting section 44 is configured to determine that heat accumulation of the supercooling heat accumulating material of the second heat accumulator 42 is completed when the temperature detected by the second lower temperature sensor 44*b* reaches a predetermined value or more. The heat accumulation completion detecting section 44 is not limited to the configuration described above, and only needs to be configured to detect completion of heat accumulation of the supercooling heat accumulating material.

As illustrated in FIG. 3, the heat accumulating unit 40 includes a heat dissipation completion detecting section 45 connected to the control device 7. As illustrated in FIG. 4, the heat dissipation completion detecting section 45 includes a first inlet/outlet temperature sensor 45*a* that detects a temperature difference of engine cooling water between an inlet side and an outlet side of the first channel 41*b* of the first heat accumulator 41. The heat dissipation completion detecting section 45 determines that heat dissipation of the supercooling heat accumulating material of the first heat accumulator 41 is completed when the temperature difference detected by the first inlet/outlet temperature sensor 45*a* becomes smaller than the predetermined value. That is, while the supercooling heat accumulating material of the first heat accumulator 41 dissipates heat, the temperature difference of engine cooling water between the inlet side and the outlet side of the channel of the first heat accumulator 41 is large. This temperature difference decreases as the amount of heat dissipation of the supercooling heat accumulating material decreases, and when heat dissipation of the supercooling heat accumulating material is completed, the temperature difference decreases below the predetermined value. Thus, it is reliably detected whether heat dissipation of the supercooling heat accumulating material of the first heat accumulator 41 is completed or not. The heat dissipation completion detecting section 45 also includes a second inlet/outlet temperature sensor 45*b* that detects a temperature difference of engine cooling water between the inlet side and the outlet side of the second channel 42*b* of the second heat accumulator 42. The heat dissipation completion detecting section 45 is configured to determine that heat dissipation of the supercooling heat accumulating material of the second heat accumulator 42 is completed when the temperature difference detected by the second inlet/outlet temperature sensor 45*b* becomes smaller than a predetermined value.

As illustrated in FIG. 3, the heat accumulating unit 40 includes a supercooling cancel device 46 connected to the control device 7. The supercooling cancel device 46 is configured to individually cancel a supercooling state of the supercooling heat accumulating material of the first heat accumulator 41 and a supercooling state of the supercooling heat accumulating material of the second heat accumulator 42. That is, as illustrating FIG. 4, the supercooling cancel device 46 includes a first trigger generating section 46*a* and a second trigger generating section 46*b*. The first trigger generating section 46*a* is provided in the first heat accumulator 41 and used for canceling the supercooling state of the supercooling heat accumulating material of the first heat accumulator 41. The second trigger generating section 46*b* is provided in the second heat accumulator 42, and used for canceling the supercooling state of the supercooling heat accumulating material of the second heat accumulator 42.

Examples of the trigger for canceling the supercooling state include vibrations. Thus, the first trigger generating section 46*a* and the second trigger generating section 46*b* can be constituted by, for example, ultrasonic wave generating devices (ultrasonic trigger devices) that continuously generate ultrasonic waves. An amplitude and a frequency may be set such that a supercooling heat accumulating material in a supercooling state nucleates, which is well known.

The supercooling cancel device 46 is controlled by the control device 7. The control device 7 is configured to output any one of a control signal for actuating only the first trigger generating section 46*a*, a control signal for actuating only the second trigger generating section 46*b*, or a control signal for actuating both the first trigger generating section 46*a* and the second trigger generating section 46*b*, to the supercooling cancel device 46 depending on situations in a manner described later. When the supercooling cancel device 46 receives the control signal for actuating only the first trigger generating section 46a, only the first trigger generating section 46a is actuated. When the supercooling cancel device 46 receives the control signal for actuating only the second trigger generating section 46b, only the second trigger generating section 46b is actuated. When the supercooling cancel device 46 receives the control signal for actuating both the first trigger generating section 46a and the second trigger generating section 46b, both the first trigger generating section 46a and the second trigger generating section 46b are actuated. Thus, the supercooling states of the supercooling heat accumulating material of the first heat accumulator 41 and the supercooling heat accumulating material of the second heat accumulator 42 can be canceled at a time. The first trigger generating section 46a and the second trigger generating section 46b may be united such that the supercooling states of the supercooling heat accumulating material of the first heat accumulator 41 and the supercooling heat accumulating material of the second heat accumulator 42 can be canceled at a time by a common trigger generating section.

Figure 5:
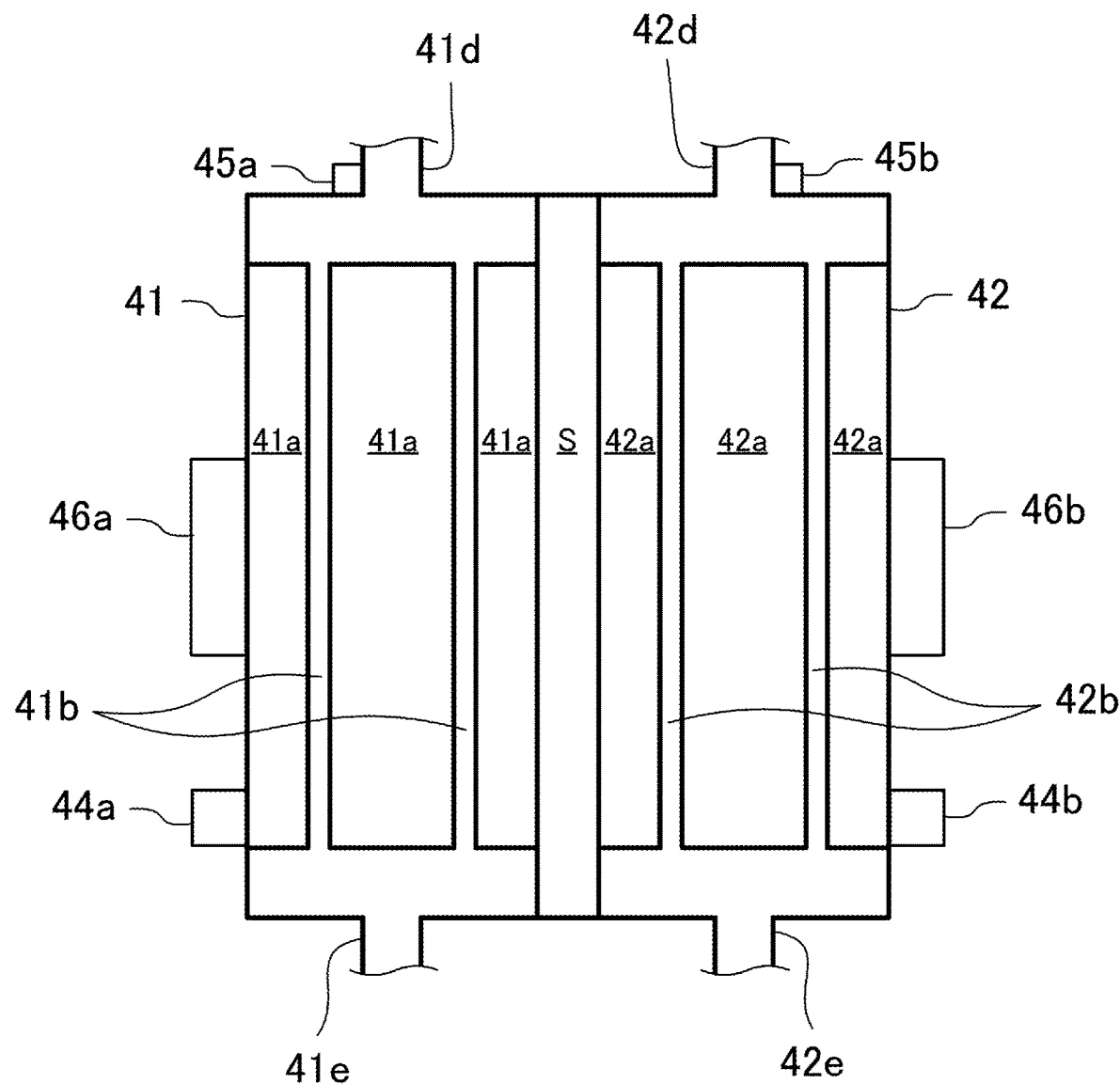
FIG. 5 is a cross-sectional view of a heat accumulating unit according to a first variation.

FIG. 5 illustrates a part of the heat accumulating unit 40 according to a first variation of the first embodiment. In the heat accumulating unit 40 of the first variation, a gap S is provided between the first heat accumulator 41 and the second heat accumulator 42. The presence of the gap S can reduce heat transfer between the first heat accumulator 41 and the second heat accumulator 42.

As illustrated in FIG. 6, the bypass pipe B1 is a pipe for causing engine cooling water that has flowed out of the first channel 41b of the first heat accumulator 41 to bypass the second channel 42b of the second heat accumulator 42. A downstream side of the first lower pipe 41e of the first heat accumulator 41, an upstream side of the bypass pipe B1, and an upstream side of the second lower pipe 42e of the second heat accumulator 42 are connected to the switching valve 43 illustrated in FIG. 6. Thus, the switching valve 43 is disposed between the first heat accumulator 41 and the second heat accumulator 42.

A downstream side of the bypass pipe B1 is connected to a downstream side of the second upper pipe 42d of the second heat accumulator 42. The downstream side of the bypass pipe B1 and the downstream side of the second upper pipe 42d of the second heat accumulator 42 are connected to an upstream side of the ATF oil heat exchanger supply pipe P7.

When the downstream side of the first lower pipe 41e of the first heat accumulator 41 and the upstream side of the second lower pipe 42e of the second heat accumulator 42 are connected to each other, the first channel 41b of the first heat accumulator 41 and the second channel 42b of the second heat accumulator 42 can be connected in series. Thus, the first lower pipe 41e of the first heat accumulator 41 and the second lower pipe 42e of the second heat accumulator 42 are a serial connection pipe B2 connecting the channel of the upstream heat accumulator and the channel of the downstream heat accumulator in series according to the present invention.

The switching valve 43 serves as a pipe switching section for switching between the serial connection pipe B2 and the bypass pipe B1, is constituted by an electric channel switching valve device known to date, and is connected to the control device 7. The control device 7 controls the switching valve 43 to perform switching between a bypass state shown in FIG. 6(a) and a serial connection state shown in FIG. 6(b). As illustrated in FIG. 6(a), when the switching valve 43 causes the first lower pipe 41e of the first heat accumulator 41 to communicate with the bypass pipe B1, causes the first lower pipe 41e of the first heat accumulator 41 to non-communicate with the second lower pipe 42e of the second heat accumulator 42, and causes the bypass pipe B1 to non-communicate with the second lower pipe 42e of the second heat accumulator 42, a bypass state is established. The control device 7 can output a control signal to the switching valve 43 to obtain the bypass state. In the bypass state, engine cooling water that has flowed out of the first channel 41b of the first heat accumulator 41 flows in the first lower pipe 41e, the switching valve 43, and the bypass pipe B1 to enter the ATF oil heat exchanger supply pipe P7.

On the other hand, as illustrated in FIG. 6(b), when the switching valve 43 causes the first lower pipe 41e of the first heat accumulator 41 to communicate with the second lower pipe 42e of the second heat accumulator 42, causes the first lower pipe 41e of the first heat accumulator 41 to non-communicate with the bypass pipe B1, and causes the second lower pipe 42e of the second heat accumulator 42 to non-communicate with the bypass pipe B1, a serial connection state is established. The control device 7 can output a control signal to the switching valve 43 to obtain the serial connection state. In the serial connection state, engine cooling water that has flowed out of the first channel 41b of the first heat accumulator 41 flows in the first lower pipe 41e, the switching valve 43, the second lower pipe 42e of the second heat accumulator 42, the second channel 42b (shown in FIG. 5), and the second upper pipe 42d, and enters the ATF oil heat exchanger supply pipe P7.

Figure 7:
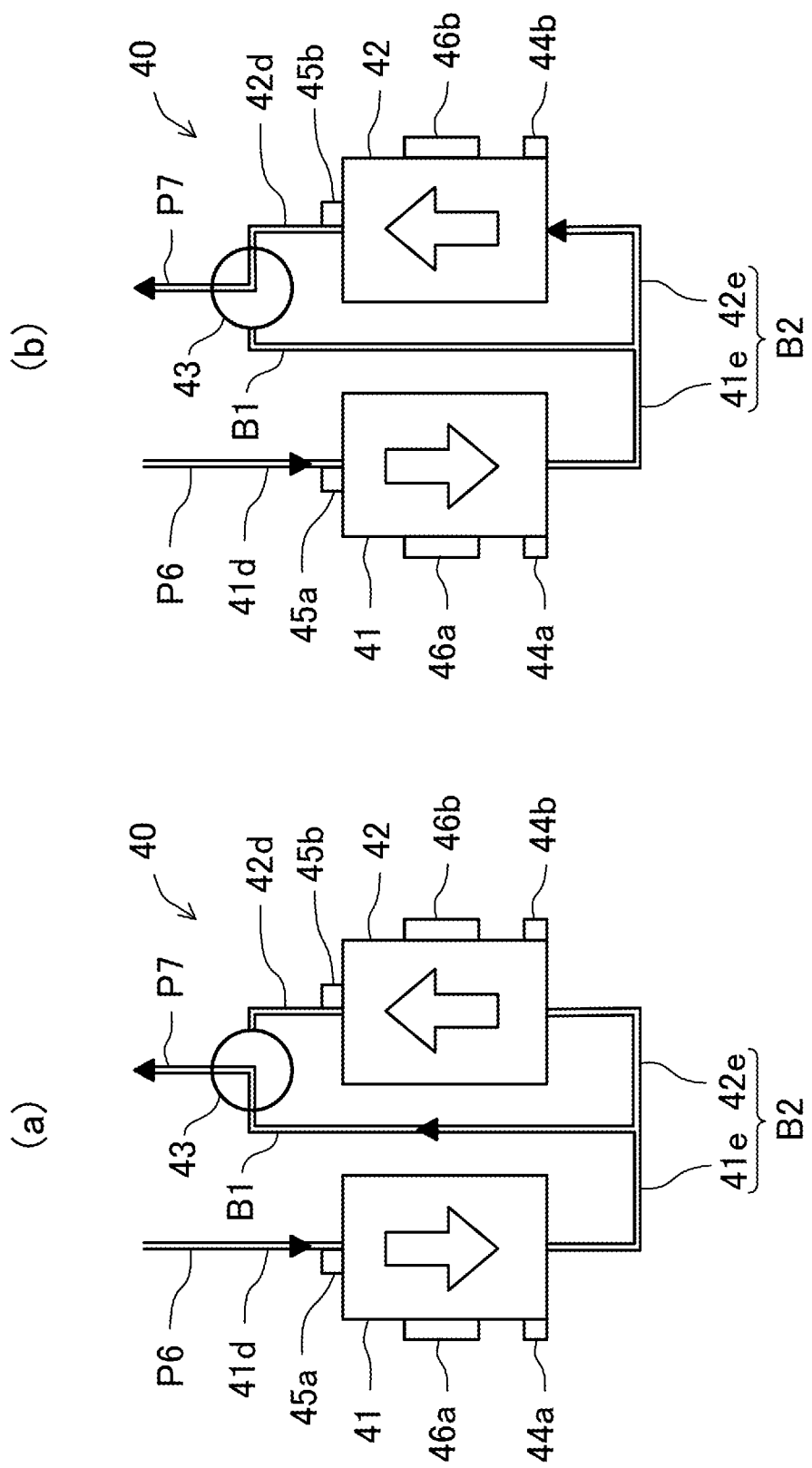
FIG. 7 is a view showing a flow of engine cooling water in a heat accumulating unit according to a second variation.

FIG. 7 illustrates a second variation of the first embodiment. In the second variation, the location of the switching valve 43 is changed. Specifically, the switching valve 43 is disposed downstream of the second channel 42b of the second heat accumulator 42 in the flow direction of engine cooling water. To this switching valve 43, the downstream side of the bypass pipe B1, a downstream side of the second upper pipe 42d of the second heat accumulator 42, and the upstream side of the ATF oil heat exchanger supply pipe P7 are connected. The upstream side of the bypass pipe B1 is connected to the downstream side of the first lower pipe 41e of the first heat accumulator 41 and the upstream side of the second lower pipe 42e of the second heat accumulator 42. The downstream side of the first lower pipe 41e of the first heat accumulator 41 is connected to the upstream side of the second lower pipe 42e of the second heat accumulator 42.

The control device 7 controls the switching valve 43 to perform switching between a bypass state shown in FIG. 7(a) and a serial connection state shown in FIG. 7(b). As illustrated in FIG. 7(a), when the switching valve 43 causes the bypass pipe B1 to communicate with the ATF oil heat exchanger supply pipe P7, causes the bypass pipe B1 to non-communicate with the second upper pipe 42d of the second heat accumulator 42, and causes the second upper pipe 42d of the second heat accumulator 42 to non-communicate with the ATF oil heat exchanger supply pipe P7, a bypass state is established. The control device 7 can output a control signal to the switching valve 43 to obtain the bypass state. In the bypass state, engine cooling water that has flowed out of the first channel 41b of the first heat accumulator 41 flows in the first lower pipe 41e, the bypass pipe B1, and the switching valve 43, and enters the ATF oil heat exchanger supply pipe P7.

On the other hand, as illustrated in FIG. 7(b), when the switching valve 43 causes the second upper pipe 42d of the second heat accumulator 42 to communicate with the ATF oil heat exchanger supply pipe P7, causes the bypass pipe B1 to non-communicate with the second upper pipe 42*d* of the second heat accumulator 42, and causes the bypass pipe B1 to non-communicate with the ATF oil heat exchanger supply pipe P7, a serial connection state is established. The control device 7 can output a control signal to the switching valve 43 to obtain the serial connection state. In the serial connection state, engine cooling water that has flowed out of the first channel 41*b* of the first heat accumulator 41 flows in the first lower pipe 41*e*, the second lower pipe 42*e* of the second heat accumulator 42, the second channel 42*b* (shown in FIG. 5), the second upper pipe 42*d*, and the switching valve 43, and enters the ATF oil heat exchanger supply pipe P7.

(Configuration of Control Device 7)

The control device 7 illustrated in FIG. 3 is constituted by a microcomputer including a central processing unit (CPU), a RAM, a ROM, and so forth, and is configured to operate in accordance with programs. Although the control device 7 includes the air-conditioning control section 7*a* for controlling the vehicular air-conditioning device 4 and a heat accumulation control section 7*b* for controlling the heat accumulating unit 40 in this embodiment, the air-conditioning control section 7*a* and the heat accumulation control section 7*b* may be constituted by other control devices.

Air-conditioning control sensors 28 are connected to the air conditioning control device 7. The air-conditioning control sensors 28 are, for example, an outdoor air temperature sensor, an indoor air temperature sensor, a solar radiation quantity sensor, or an evaporator sensor. The air-conditioning control section 7*a* of the control device 7 controls the indoor/outdoor air switching actuator 11*d*, the blower motor 15*b*, the air-mix actuator 18*a*, and the air discharge direction switching actuator 27, for example, based on information obtained from the air-conditioning control sensors 28. The indoor/outdoor air switching actuator 11*d*, the blower motor 15*b*, the air-mix actuator 18*a*, and the air discharge direction switching actuator 27 are also controlled based on an air-conditioning operation state of a passenger.

The heat accumulation control section 7*b* is configured such that when the supercooling heat accumulating material is in a supercooling state and a temperature rise of ATF as a warming target is requested, the heat accumulation control section 7*b* causes the supercooling cancel device 46 to cancel the supercooling state of the supercooling heat accumulating material and establishes a temperature rise mode of increasing the temperature of ATF. The heat accumulation control section 7*b* controls the switching valve 43 such that the first channel 41*b* of the first heat accumulator 41 and the second channel 42*b* of the second heat accumulator 42 are set in the serial connection state by the serial connection pipe B2 in heat accumulation of the supercooling heat accumulating material, whereas engine cooling water that has flowed in the first channel 41*b* of the first heat accumulator 41 flows in the bypass pipe B1 in the temperature rise mode.

The heat accumulation control section 7*b* may also be configured such that while the supercooling heat accumulating material of at least one of the first heat accumulator 41 or the second heat accumulator 42 of the heat accumulating unit 40 is in the supercooling state and a temperature rise of ATF is requested, the heat accumulation control section 7*b* causes the supercooling cancel device 46 to cancel the supercooling state of the supercooling heat accumulating material that is in the supercooling state and the temperature rise mode of increasing a warming target is established.

Whether the first heat accumulator 41 and the second heat accumulator 4 are in the supercooling states or not can be individually detected by the first lower temperature sensor 44*a* and the second lower temperature sensor 44*b* of the heat accumulation completion detecting section 44. Specifically, the heat accumulation completion detecting section 44 determines that heat accumulation of the supercooling heat accumulating material of the first heat accumulator 41 is completed when the temperature detected by the first lower temperature sensor 44*a* reaches a predetermined value or more, and determines that heat accumulation of the supercooling heat accumulating material of the second heat accumulator 42 is completed when the temperature detected by the second lower temperature sensor 44*b* reaches a predetermined value or more, and these detection signals are received by the control device 7 so that the heat accumulation control section 7*b* can determine whether the first heat accumulator 41 and the second heat accumulator 4 are in the supercooling states or not.

Whether a temperature rise of ATF is requested or not can be determined by the heat accumulation control section 7*b* based on reception by the control device 7 of information on the ATF temperature output from the ATF temperature sensor 3*b*. If the ATF temperature detected by the ATF temperature sensor 3*b* is a low temperature less than or equal to a predetermined temperature, it is determined that a temperature rise of ATF is requested, whereas if the ATF temperature detected by the ATF temperature sensor 3*b* is higher than the predetermined temperature, it is determined that a temperature rise of ATF is not requested. This predetermined temperature can be a temperature when warming of the automatic transmission 3 is completed, and can be set at a temperature between 40° C. to 60° C., for example.

Since the serial connection state (shown in FIGS. 6(*b*) and 7(*b*)) is established in the heat accumulating mode, while engine cooling water that has taken heat from the engine as a heat source circulates in the circulation circuit A, the engine cooling water flows in the first channel 41*b* of the first heat accumulator 41 and the second channel 42*b* of the second heat accumulator 42 in the heat accumulating unit 40 in this order. The supercooling heat accumulating material takes heat from engine cooling water flowing in the first channel 41*b* of the first heat accumulator 41 and the second channel 42*b* of the second heat accumulator 42 to thereby accumulate heat. In this heat accumulating mode, engine cooling water flows in the first channel 41*b* of the first heat accumulator 41 located at an upstream side in the flow direction of the engine cooling water and then flows in the second channel 42*b* of the second heat accumulator 42. Thus, the supercooling heat accumulating material of the first heat accumulator 41 tends to melt more quickly to be in a supercooling state than the supercooling heat accumulating material of the second heat accumulator 42. Thus, even in a case where the engine 2 stops in a short time after cold start, for example, the supercooling heat accumulating material of the first heat accumulator 41 can be made in a supercooling state.

In a case where an ATF temperature rise is requested, the supercooling state of the supercooling heat accumulating material of the first heat accumulator 41 is canceled by the supercooling cancel device 46, and the heat accumulating unit 40 is switched from the heat accumulating mode to the temperature rise mode. In the temperature rise mode, engine cooling water flows while bypassing the second channel 42*b* of the second heat accumulator 42. At this time, since the supercooling heat accumulating material of the first heat accumulator 41 releases latent heat of solidification, engine cooling water flowing in the first channel 41*b* of the first heat accumulator 41 takes heat and increases in temperature. Accordingly, the effect of warming ATF is enhanced. On the other hand, if the heat accumulation time is short, the supercooling heat accumulating material of the second heat accumulator 42 does not reach the supercooling state in some cases. In such cases, the supercooling heat accumulating material of the second heat accumulator 42 does not dissipate heat, but since engine cooling water does not flow in the second heat accumulator 42, latent heat is not taken from the engine cooling water, and a heat dissipation loss can be reduced accordingly.

The heat accumulation control section 7b may be configured such that the heat accumulation control section 7b allows engine cooling water that has flowed in the first channel 41b of the first heat accumulator 41 to flow in the bypass pipe B1 until the heat dissipation completion detecting section 45 detects completion of heat dissipation of the supercooling heat accumulating material of the first heat accumulator 41, whereas when the heat dissipation completion detecting section 45 detects completion of heat dissipation of the supercooling heat accumulating material of the first heat accumulator 41, the heat accumulation control section 7b controls the switching valve 43 such that engine cooling water that has flowed in the first channel 41b of the first heat accumulator 41 flows in the second channel 42b of the second heat accumulator 42. This control is applicable to a case where heat accumulation is completed in both the supercooling heat accumulating material of the first heat accumulator 41 and the supercooling heat accumulating material of the second heat accumulator 42. Weather heat accumulation is completed in both the supercooling heat accumulating material of the first heat accumulator 41 and the supercooling heat accumulating material of the second heat accumulator 42 or not can be determined by the heat accumulation control section 7b based on an output of the heat accumulation completion detecting section 44.

Specifically, the switching valve 43 is kept in a bypass state until the heat dissipation completion detecting section 45 detects completion of heat dissipation of the supercooling heat accumulating material of the first heat accumulator 41, and the switching valve 43 is set in the serial connection state when completion of heat dissipation of the supercooling heat accumulating material of the first heat accumulator 41 is detected. Accordingly, engine cooling water takes heat until heat dissipation of the supercooling heat accumulating material of the first heat accumulator 41 is completed, and thus, it is possible to prevent engine cooling water from flowing in the second channel 42b of the second heat accumulator 42 where a heat dissipation loss might occur. Accordingly, the temperature of ATF can be increased early. Thereafter, when heat dissipation of the supercooling heat accumulating material of the first heat accumulator 41 is completed, engine cooling water flows in the second channel 42b of the second heat accumulator 42. At this time, if the supercooling heat accumulating material of the second heat accumulator 42 is in the state of enabling heat dissipation, engine cooling water takes heat from this supercooling heat accumulating material so that the temperature of the engine cooling water increases.

The heat accumulation control section 7b may also be configured such that the first trigger generating section 46a of the supercooling cancel device 46 cancels the supercooling state of the supercooling heat accumulating material of the first heat accumulator 41 when the engine 2 as a heat source reaches the state of generating heat from the state of generating no heat, and the second trigger generating section 46b of the supercooling cancel device 46 cancels the supercooling state of the supercooling heat accumulating material of the second heat accumulator 42 when the heat dissipation completion detecting section 44 detects completion of heat dissipation of the supercooling heat accumulating material of the first heat accumulator 41. In this case, this control is applicable to the case where heat accumulation is completed in both the supercooling heat accumulating material of the first heat accumulator 41 and the supercooling heat accumulating material of the second heat accumulator 42.

In this manner, heat dissipation of the supercooling heat accumulating material of the second heat accumulator 42 starts after heat dissipation of the supercooling heat accumulating material of the first heat accumulator 41 has been completed. Thus, both the quantity of heat accumulated in the supercooling heat accumulating material of the first heat accumulator 41 and the quantity of heat accumulated in the supercooling heat accumulating material of the second heat accumulator 42 can be supplied to engine cooling water.

Advantages of Embodiment

As described above, in the vehicular heat accumulating system 1 according to this embodiment, while engine cooling water that has taken heat from the engine 2 circulates in the circulation circuit A, the heat accumulating unit 40 takes heat from the engine cooling water so that heat is accumulated. In heat accumulation, the switching valve 43 causes the first channel 41b of the first heat accumulator 41 and the second channel 42b of the second heat accumulator 42 to be connected in series by the serial connection pipe B2 so that engine cooling water flows in the second channel 42b of the second heat accumulator 42, after flowing in the first channel 41b of the first heat accumulator 41. Accordingly, the supercooling heat accumulating material of the first heat accumulator 41 tends to melt more quickly to be a supercooling state than the supercooling heat accumulating material of the second heat accumulator 41. Thus, even in a case where the engine 2 stops in a short time after cold start, the supercooling heat accumulating material of the first heat accumulator 41 can be set in the supercooling state.

If an ATF temperature rise is requested, the supercooling state of the supercooling heat accumulating material of the first heat accumulator 41 is canceled by the supercooling cancel device 46, and the heat accumulating unit 40 is switched from the heat accumulating mode to the temperature rise mode. In the temperature rise mode, the switching valve 43 causes engine cooling water that has flowed in the first channel 41b of the first heat accumulator 41 to flow in the bypass pipe B1. At this time, since the supercooling heat accumulating material of the first heat accumulator 41 dissipates latent heat of solidification, cooling fluid flowing in the first channel 41b of the first heat accumulator 41 takes heat and increases in temperature. Accordingly, warm-up effect is enhanced. On the other hand, if the heat accumulation time is short, the supercooling heat accumulating material of the second heat accumulator 42 does not reach the supercooling state in some cases. In such cases, the supercooling heat accumulating material of the second heat accumulator 42 does not dissipate heat, but since cooling fluid does not flow in the second channel 42b of the second heat accumulator 42, latent heat is not taken from the cooling fluid, and a heat dissipation loss can be reduced accordingly.

In addition, since engine cooling water takes heat until heat dissipation of the supercooling heat accumulating material of the first heat accumulator 41 is completed, it is possible to prevent cooling fluid from flowing in the second channel 42b of the second heat accumulator 42 where a heat dissipation loss might occur. On the other hand, when heat dissipation of the supercooling heat accumulating material of the first heat accumulator 41 is completed, engine cooling water flows in the second channel 42b of the second heat accumulator 42. At this time, if the supercooling heat accumulating material of the second heat accumulator 42 is in the state of enabling heat dissipation, engine cooling water takes heat from this supercooling heat accumulating material so that the temperature of the engine cooling water increases.

In addition, the presence of the switching valve 43 increases an outer surface area, and accordingly, a heat dissipation loss occurs from this area. In heat dissipation of the supercooling heat accumulating material, the temperature of cooling fluid before flowing into the second heat accumulator 42 through the first heat accumulator 41 is supposed to be lower than the temperature of the engine cooling water at the outlet side of the second heat accumulator 42. The switching valve 43 is provided not at the outlet side of the second heat accumulator 42 where engine cooling water having a relatively high temperature flows but in a portion between the first heat accumulator 41 and the second heat accumulator 42 where cooling water having a relatively low temperature flows so that a loss in heat dissipation due to an increase in the outer surface area can be thereby reduced.

In heat accumulation of the supercooling heat accumulating material, the temperature of engine cooling water that has flowed out of the second heat accumulator 42 through the first heat accumulator 41 is supposed to be lower than the temperature of cooling fluid at the inlet side of the first heat accumulator 41 and the temperature of engine cooling water flowing between the first heat accumulator 41 and the downstream heat accumulator. Since the switching valve 43 is provided in a portion where engine cooling water having a relatively low temperature flows in heat accumulation, a loss in heat accumulation due to an increase in the outer surface area can be reduced.

In addition, as illustrated in FIG. 4, a wall portion of a part of the first heat accumulator 41 and a wall portion of the second heat accumulator 42 are shared, warming efficiency of engine cooling water in the temperature rise mode can be increased so that the temperature of engine cooling water can be increased early. In addition, the number of parts constituting the heat accumulating unit 40 can be reduced, and the size of the heat accumulating unit 40 can be reduced.

As illustrated in FIG. 5, since the gap S is provided between the first heat accumulator 41 and the second heat accumulator 42, heat transfer between the first heat accumulator 41 and the second heat accumulator 42 is reduced so that the time before completion of heat accumulation of the supercooling heat accumulating material of the first heat accumulator 41 can be shortened, and heat dissipation effect after the short heat accumulation time can be sufficiently obtained.

Second Embodiment

Figure 8:
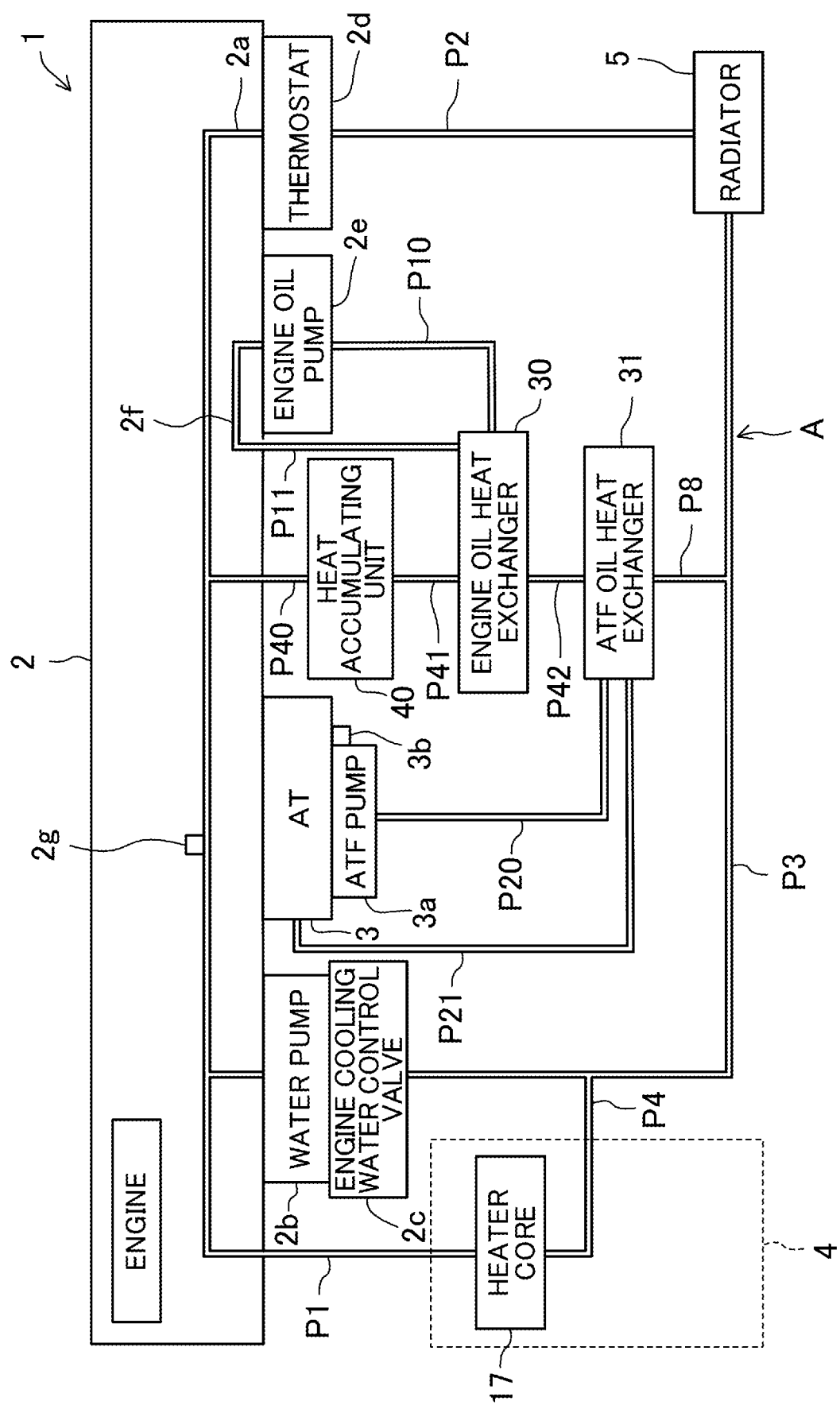
FIG. 8 is a view according to a second embodiment and corresponding to FIG. 1.

FIG. 8 illustrates an example configuration of a vehicular heat accumulating system 1 according to a second embodiment of the present invention. The second embodiment is different from the first embodiment in that a warming target is engine oil. In the following description, the same components as those of the first embodiment are denoted by the same reference characters and will not be described again, and components different from those of the first embodiment will be described in detail.

Specifically, a heat accumulating unit 40 is disposed between a water jacket 2a and an engine oil heat exchanger 30. A circulation circuit A includes a heat accumulating unit supply pipe P40 extending from a water jacket 2a to a heat accumulating unit 40, an engine oil heat exchanger supply pipe P41 extending from the heat accumulating unit 40 to an engine oil heat exchanger 30, and an ATF oil heat exchanger supply pipe P42 extending from the engine oil heat exchanger 30 to an ATF oil heat exchanger 31. Engine cooling water that has flowed through the heat accumulating unit supply pipe P40 enters a first channel 41b of a first heat accumulator 41 and a second channel 42b of a second heat accumulator 42 of the heat accumulating unit 40. Engine cooling water that has flowed in the first channel 41b of the first heat accumulator 41 and the second channel 42b of the second heat accumulator 42 enters the engine oil heat exchanger 30.

In a configuration of this second embodiment, while a supercooling heat accumulating material in at least one of the first heat accumulator 41 or the second heat accumulator 42 of the heat accumulating unit 40 is in a supercooling state and a temperature rise of engine oil as a warming target is requested, the supercooling state of the supercooling heat accumulating material that is in the supercooling state is canceled by the supercooling cancel device 46, and a temperature rise mode of increasing the temperature of the warming target is established. The temperature rise request of engine oil can be determined by a heat accumulation control section 7b by reception, by the control device 7, of information on engine cooling water temperature output from an engine cooling water temperature sensor 2g. This is because the engine cooling water temperature and the engine oil temperature have a correlation. If the engine cooling water temperature detected by the engine cooling water temperature sensor 2g is a low temperature less than or equal to a predetermined temperature, it is determined that a temperature rise of engine oil is requested, whereas if the engine cooling water temperature of the engine cooling water temperature sensor 2g is higher than the predetermined temperature, it is determined that a temperature rise of engine oil is not requested. The predetermined temperature in this case can be a temperature when warming of an engine 2 is completed, and can be set at a temperature between 40° C. to 60° C., for example.

In the second embodiment, advantages similar to those of the first embodiment can be obtained, and the engine 2 can be warmed early.

Third Embodiment

Figure 9:
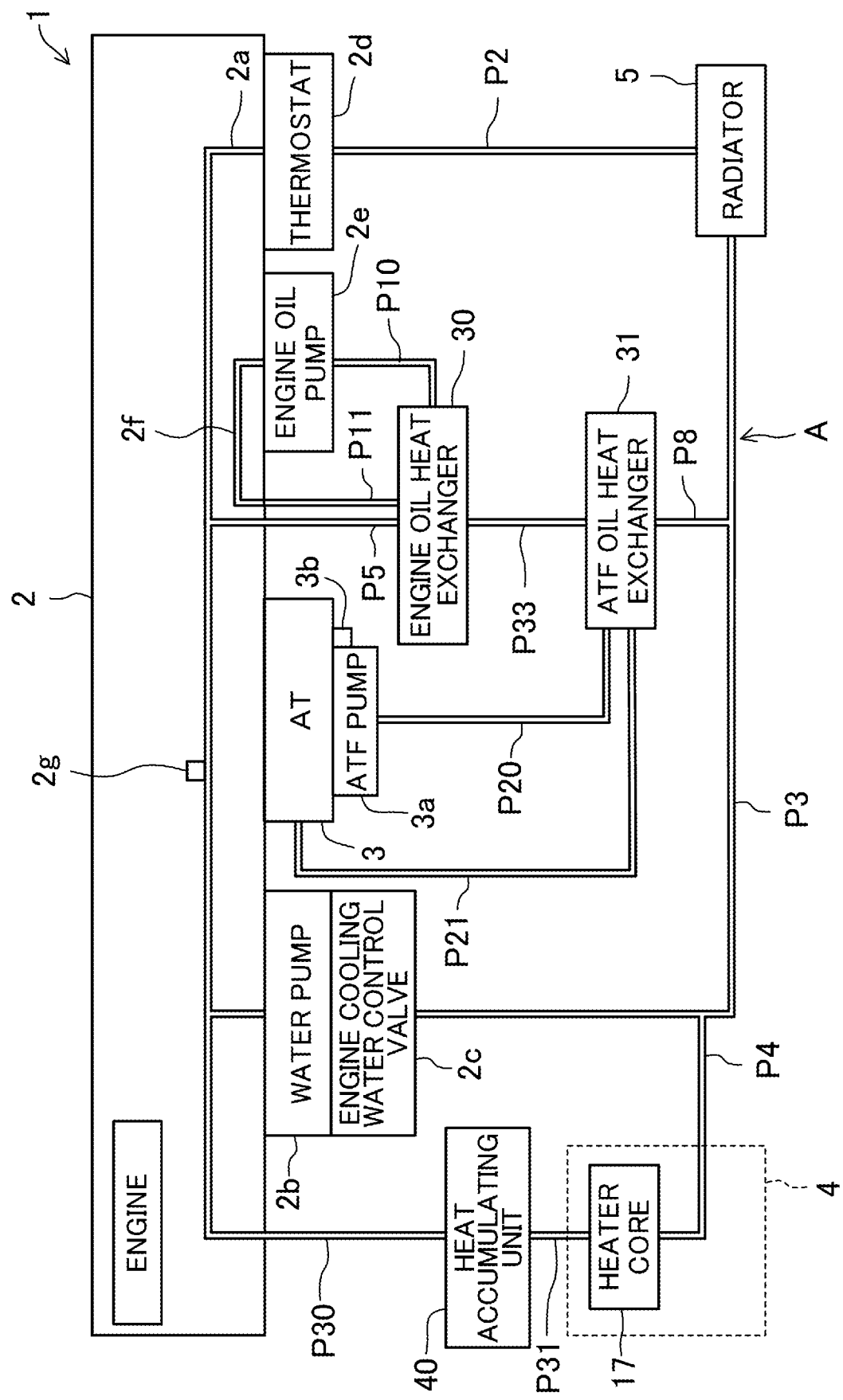
FIG. 9 is a view according to a third embodiment and corresponding to FIG. 1.

FIG. 9 illustrates an example configuration of a vehicular heat accumulating system 1 according to a third embodiment of the present invention. The third embodiment is different from the first embodiment in that a warming target is air-conditioning air to be warmed by a heater core 17. In the following description, the same components as those of the first embodiment are denoted by the same reference characters and will not be described again, and components different from those of the first embodiment will be described in detail.

Specifically, a heat accumulating unit 40 is disposed between a water jacket 2a and a heater core 17. A circulation circuit A includes a heat accumulating unit supply pipe P30 extending from the water jacket 2a to a heat accumulating unit 40, and a heater core supply pipe P31 extending from the heat accumulating unit 40 to the heater core 17. Engine cooling water that has flowed through the heat accumulating unit supply pipe P30 enters a first channel 41b of a first heat accumulator 41 and a second channel 42b of a second heat accumulator 42 of the heat accumulating unit 40. Engine cooling water that has flowed in the first channel 41b of the first heat accumulator 41 and the second channel 42b of the second heat accumulator 42 enters the heater core supply pipe P31.

The circulation circuit A includes an ATF oil heat exchanger supply pipe P33 extending from an outlet side of an engine oil heat exchanger 30 to an inlet side of an ATF oil heat exchanger 31.

In the configuration of the third embodiment, while a supercooling heat accumulating material in at least one of the first heat accumulator 41 or the second heat accumulator 42 of the heat accumulating unit 40 is in a supercooling state and a temperature rise of air-conditioning air as a warming target is requested, the supercooling state of the supercooling heat accumulating material that is in the supercooling state is canceled by the supercooling cancel device 46, and a temperature rise mode of increasing the temperature of the warming target is established. A request for a temperature rise request of air-conditioning air, that is, a temperature rise of the heater core 17, can be determined by a heat accumulation control section 7b by reception, by the control device 7, of information on engine cooling water temperature output from an engine cooling water temperature sensor 2g. If the engine cooling water temperature detected by the engine cooling water temperature sensor 2g is a low temperature less than or equal to a predetermined temperature, it is determined that a temperature rise of the heater core 17 is requested, whereas if the engine cooling water temperature of the engine cooling water temperature sensor 2g is higher than the predetermined temperature, it is determined that a temperature rise of the heater core 17 is not requested. The predetermined temperature in this case can be a temperature at which a heating capacity requested by the air-conditioning control section 7a is obtained, and can be set at a temperature between 40° C. to 60° C., for example.

In the third embodiment, advantages similar to those of the first embodiment can be obtained, and heating capacity especially in a winter season can be enhanced.

The above-described embodiments are merely examples in all respects, and should not be construed as limiting. Further, all variations and modifications belonging to the equivalent scope of the claims are within the scope of the present invention. For example, cooling fluid may be a substance except for engine cooling water, and may be cooling water of a water or cooling water of an inverter, for example.

As described above, a vehicular heat accumulating system according to the present invention is applicable to an automobile on which an automatic transmission and/or an air-conditioning device is mounted, for example.

The invention claimed is:

1. A vehicular heat accumulating system comprising a circulation circuit in which fluid circulates, wherein
   the circulation circuit includes a heat accumulating unit that accumulates heat from the fluid or dissipates heat to the fluid,
   the heat accumulating unit includes
   an upstream heat accumulator, the upstream heat accumulator accommodating a supercooling heat accumulating material, having a channel in which the fluid flows, configured to enable heat exchange between the fluid flowing in the channel and the supercooling heat accumulating material, disposed at an upstream side in a flow direction of the fluid,
   a downstream heat accumulator, the downstream heat accumulator accommodating a supercooling heat accumulating material, having a channel in which the fluid flows, configured to enable heat exchange between the fluid flowing in the channel and the supercooling heat accumulating material, disposed at a downstream side in the flow direction of the fluid,
   a serial connection pipe connecting the channel of the upstream heat accumulator and the channel of the downstream heat accumulator to each other in series,
   a bypass pipe configured to cause the fluid that has flowed in the channel of the upstream heat accumulator to bypass the channel of the downstream heat accumulator,
   a pipe switching section configured to perform switching between the serial connection pipe and the bypass pipe,
   a supercooling cancel device configured to cancel a supercooling state of the supercooling heat accumulating material, and
   a control device configured to control the pipe switching section and the supercooling cancel device,
   the control device causes the supercooling cancel device to cancel the supercooling state of the supercooling heat accumulating material so that a temperature rise mode in which a temperature of a warming target is increased, if the supercooling heat accumulating material is in the supercooling state and a temperature rise of the warming target is requested, and
   the control device controls the pipe switching section such that the channel of the upstream heat accumulator and the channel of the downstream heat accumulator are set in a serial connection state by the serial connection pipe in heat accumulation of the supercooling heat accumulating material, and the fluid that has passed through the upstream heat accumulator flows in the bypass pipe in the temperature rise mode.

2. The vehicular heat accumulating system according to claim 1, wherein
   the heat accumulating unit includes a heat dissipation completion detecting section that detects completion of heat dissipation of the supercooling heat accumulating material of the upstream heat accumulator, and
   the control device controls the pipe switching section such that the fluid that has flowed in the channel of the upstream heat accumulator flows in the bypass pipe until the heat dissipation completion detecting section detects completion of heat dissipation of the supercooling heat accumulating material of the upstream heat accumulator, whereas when the heat dissipation completion detecting section detects completion of heat dissipation of the supercooling heat accumulating material of the upstream heat accumulator, the fluid that has flowed in the channel of the upstream heat accumulator flows in the channel of the downstream heat accumulator.

3. The vehicular heat accumulating system according to claim 2, wherein
   the heat dissipation completion detecting section is configured to determine that dissipation of the supercooling heat accumulating material of the upstream heat accumulator is completed when a temperature difference of the fluid between an inlet side and an outlet side of the channel of the upstream heat accumulator becomes smaller than a predetermined value.

4. The vehicular heat accumulating system according to claim 2, wherein
   the supercooling cancel device is disposed in each of the upstream heat accumulator and the downstream heat accumulator, and configured to cancel the supercooling state of the supercooling heat accumulating material of the upstream heat accumulator and the supercooling state of the supercooling heat accumulating material of the downstream heat accumulator individually.

5. The vehicular heat accumulating system according to claim 4, wherein
the control device causes the supercooling cancel device to cancel the supercooling state of the supercooling heat accumulating material of the upstream heat accumulator when a heat source changes from a state where no heat is generated to a state where heat is generated, and causes the supercooling cancel device to cancel the supercooling state of the supercooling heat accumulating material of the downstream heat accumulator when the heat dissipation completion detecting section detects completion of heat dissipation of the supercooling heat accumulating material of the upstream heat accumulator.

6. The vehicular heat accumulating system according to claim 1, wherein
the pipe switching section is disposed between the upstream heat accumulator and the downstream heat accumulator.

7. The vehicular heat accumulating system according to claim 1, wherein
the pipe switching section is disposed downstream of the channel of the downstream heat accumulator.

8. The vehicular heat accumulating system according to claim 1, wherein
the heat accumulating unit includes a first heat accumulator and a second heat accumulator, and
a wall portion of a part of the first heat accumulator is shared by a wall portion of the second heat accumulator.

9. The vehicular heat accumulating system according to claim 1, wherein
the heat accumulating unit includes a first heat accumulator and a second heat accumulator, and
a gap is provided between the first heat accumulator and the second heat accumulator.

* * * * *